(12) United States Patent
Park et al.

(10) Patent No.: US 12,454,601 B2
(45) Date of Patent: Oct. 28, 2025

(54) SENSITIVE CONJUGATED POLYMER STRUCTURE COLOR AND SENSOR USING SAME

(71) Applicant: EWHA UNIVERSITY-INDUSTRY COLLABORATION FOUNDATION, Seoul (KR)

(72) Inventors: So-Jung Park, Seoul (KR); Jerome Kartham Hyun, Seoul (KR); Ji-Eun Park, Seoul (KR); Cheon Woo Moon, Seoul (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 540 days.

(21) Appl. No.: 18/060,009

(22) Filed: Nov. 30, 2022

(65) Prior Publication Data

US 2023/0151160 A1    May 18, 2023

Related U.S. Application Data

(63) Continuation of application No. PCT/KR2021/008511, filed on Jul. 5, 2021.

(30) Foreign Application Priority Data

Jul. 16, 2020    (KR) .................. 10-2020-0088139

(51) Int. Cl.
*C08G 81/00*    (2006.01)
*C08J 5/18*    (2006.01)
(Continued)

(52) U.S. Cl.
CPC ............... *C08G 81/00* (2013.01); *C08J 5/18* (2013.01); *C08K 3/08* (2013.01); *G01N 21/783* (2013.01);
(Continued)

(58) Field of Classification Search
CPC .. G01N 21/783; G01N 31/22; G01N 33/0001; C09D 165/00; C09D 187/005; C09D 7/61; C08L 101/12; C08L 65/00; C08L 87/005; C08K 2003/0806; C08K 2003/0831; C08K 2201/011; C08K 3/08; C08J 2387/00; C08J 5/18; C08G 2261/126; C08G 2261/1412; C08G 2261/3223;
(Continued)

(56) References Cited

U.S. PATENT DOCUMENTS

2010/0219399 A1*    9/2010    Fukushima ............. C08L 53/00
                                                                524/610

FOREIGN PATENT DOCUMENTS

JP    2016-217914 A    12/2016
JP        6654319 B2    2/2020
(Continued)

OTHER PUBLICATIONS

International Search Report of PCT/KR2021/008511 dated Oct. 14, 2021.
(Continued)

*Primary Examiner* — Jennifer Wecker
(74) *Attorney, Agent, or Firm* — Shih IP Law Group, PLLC

(57) ABSTRACT

The present disclosure relates to a responsive polymer film, a method of preparing the responsive polymer film, and a sensor using the polymer film.

12 Claims, 20 Drawing Sheets

(51) Int. Cl.
*C08K 3/08* (2006.01)
*G01N 21/78* (2006.01)
*G01N 33/00* (2006.01)

(52) U.S. Cl.
CPC ...... *G01N 33/0001* (2013.01); *C08J 2387/00* (2013.01); *C08K 2003/0831* (2013.01); *C08K 2201/011* (2013.01)

(58) Field of Classification Search
CPC ............ C08G 2261/43; C08G 2261/75; C08G 2261/94; C08G 61/126; C08G 65/334; C08G 81/00
See application file for complete search history.

(56) References Cited

FOREIGN PATENT DOCUMENTS

| KR | 10-2019-0020473 A | 3/2019 | |
|---|---|---|---|
| WO | WO-2015148619 A1 * | 10/2015 | ........... B32B 27/365 |

OTHER PUBLICATIONS

Saejin Oh et al., "Binary self-assembly of conjugated block copolymers and quantum dots at the air-liquid interface into ordered functional nanoarrays", ACS applied materials & interfaces, 2019, vol. 11, No. 31, p. 28538-28545.
Seyeon Hwang, "Binary self-assembly of nanoparticles and conjugated block copolymer at air-water interface", Master's thesis, Ewha Womans University, 2016, pp. 1-54.
Kazuya Tada et al., "Conducting polymer color sensor", Japan journal of applied physics, 1997, vol. 36, No. 10A, pp. 1351-1353.
Luqing Li, "Colorimetric sensor array-based artificial olfactory system for sensing Chinese green tea's quality: A method of fabrication", International journal of food properties, 2017, vol. 20, No. S2, pp. S1762-S1773.
Ming Su et al., "Multi-responsive behavior of highly water-soluble poly(3-hexylthiophene)-block-poly(phenyl isocyanide) plock copolymers", Polymer chemistry, 2015, vol. 6, No. 36, pp. 6519-6528.
Cheon Woo Moon et al., "Responsive thin-film interference colors from polaronic conjugated block copolymers", ACS applied materials & interfaces, Dec. 28, 2020, vol. 13, No. 1, pp. 1555-1561.
Liang-huei Chen et al., "Fabrication of P3HT/gold nanoparticle LB films by P3HT templating Langmuir monolayer", Applied Surface Science 320, pp. 736-741 (2014).

* cited by examiner

[FIG. 1A]
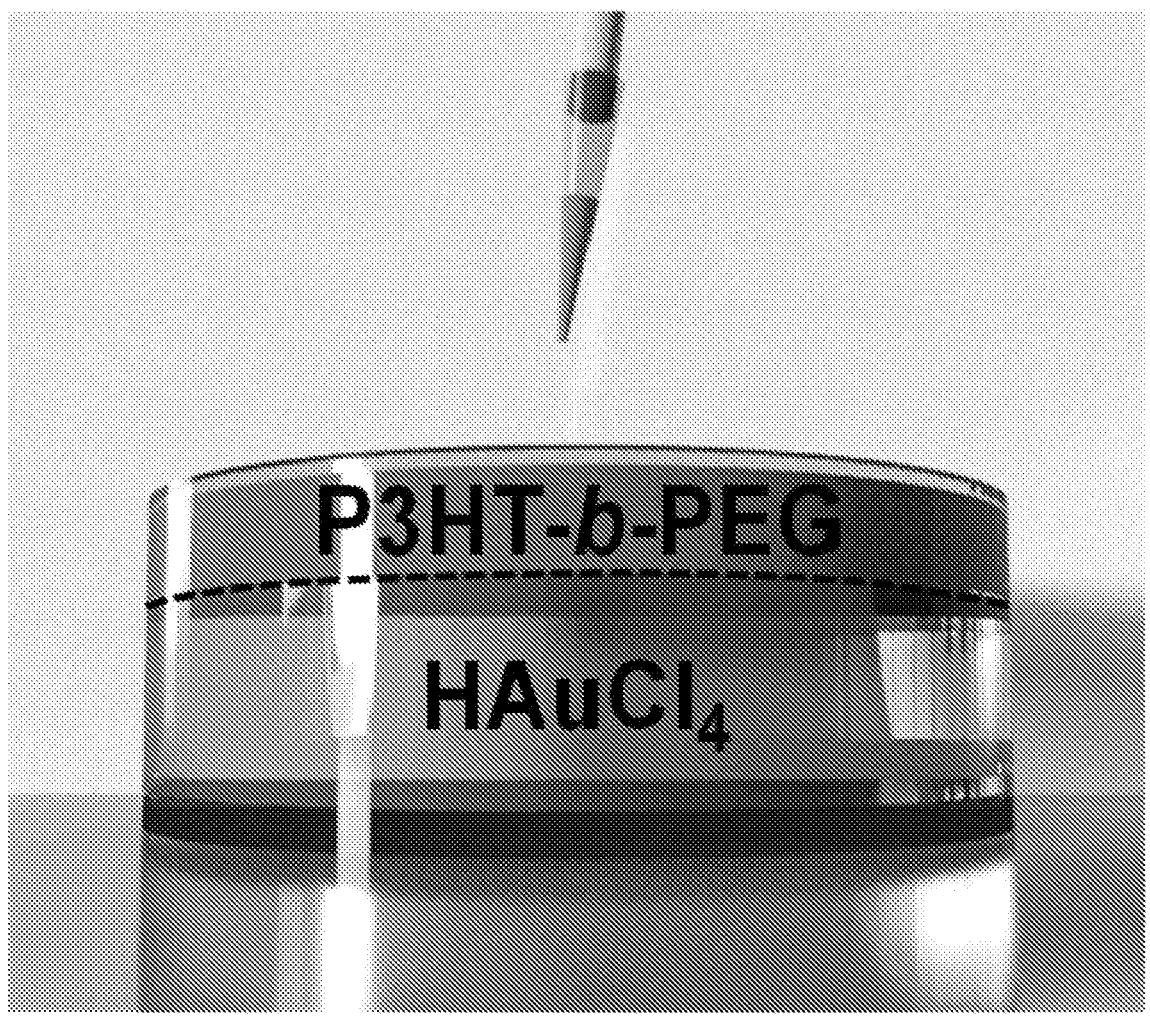

[FIG. 1B]
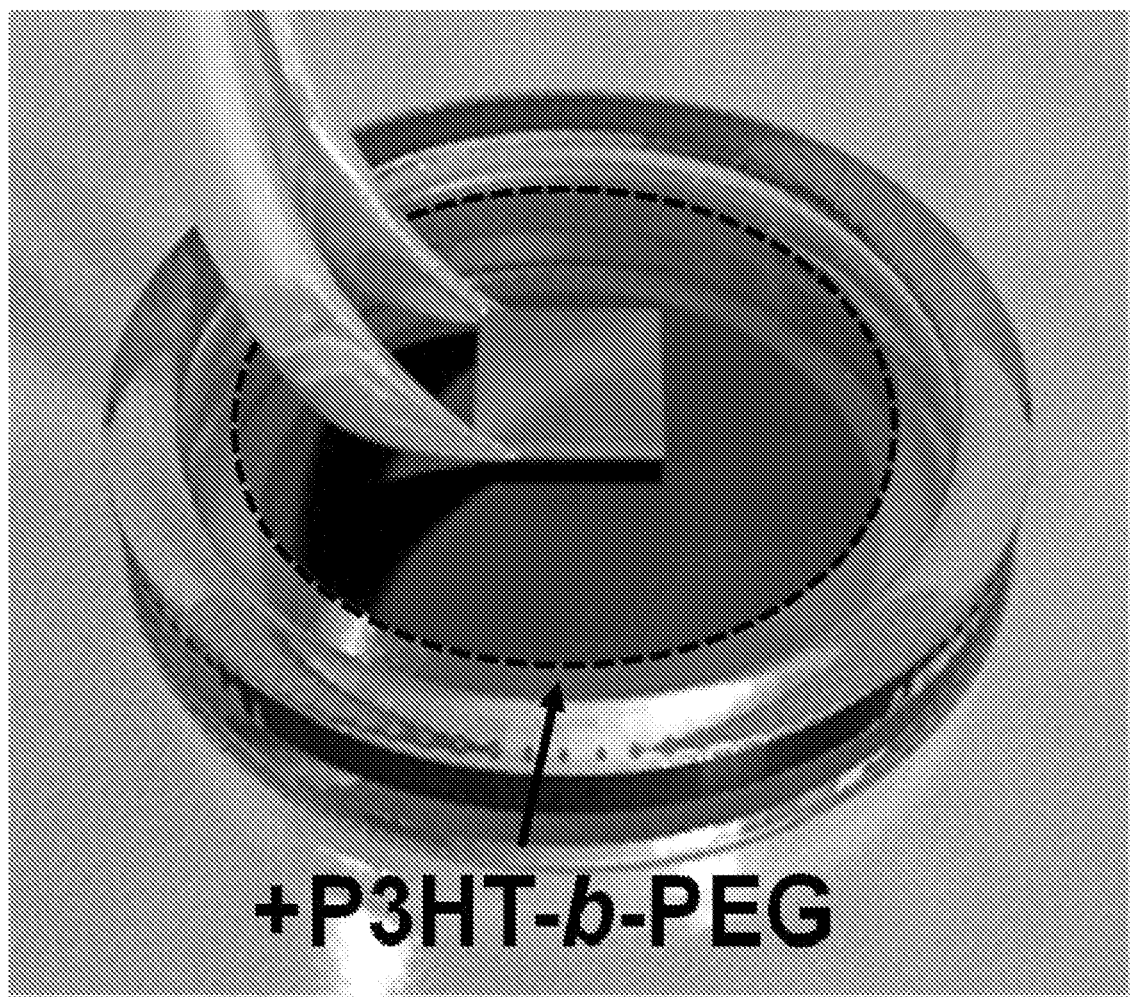

[FIG. 1C]
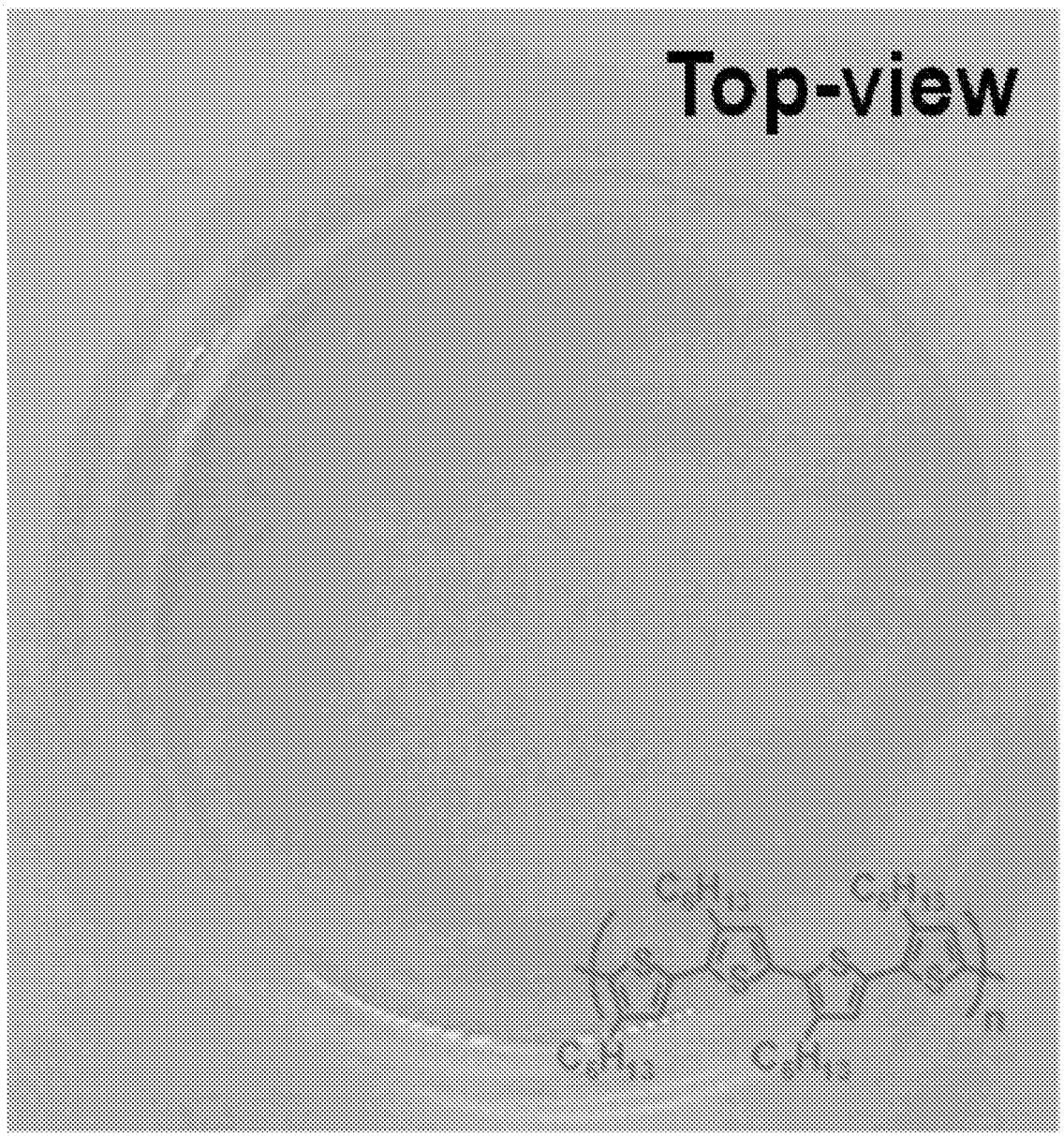

[FIG. 1D]
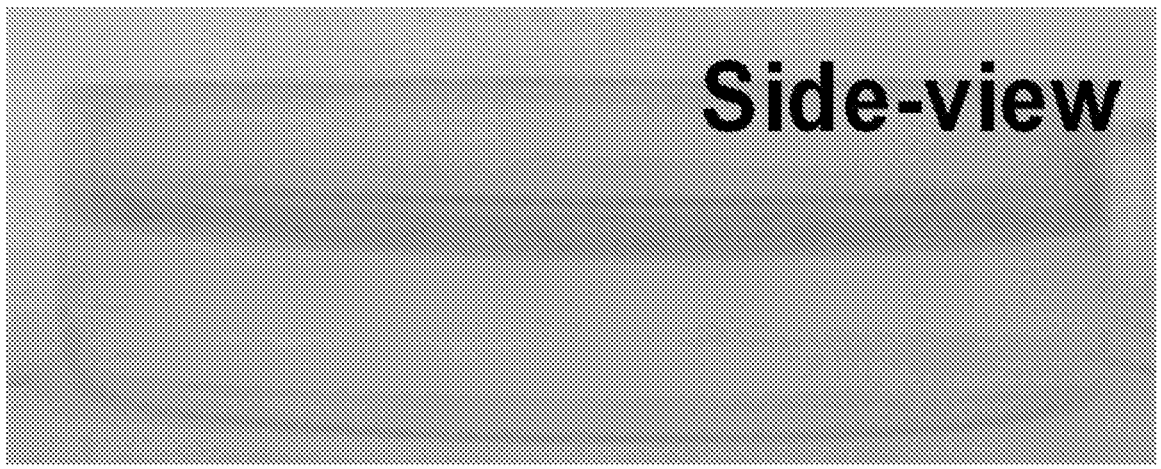

[FIG. 1E]
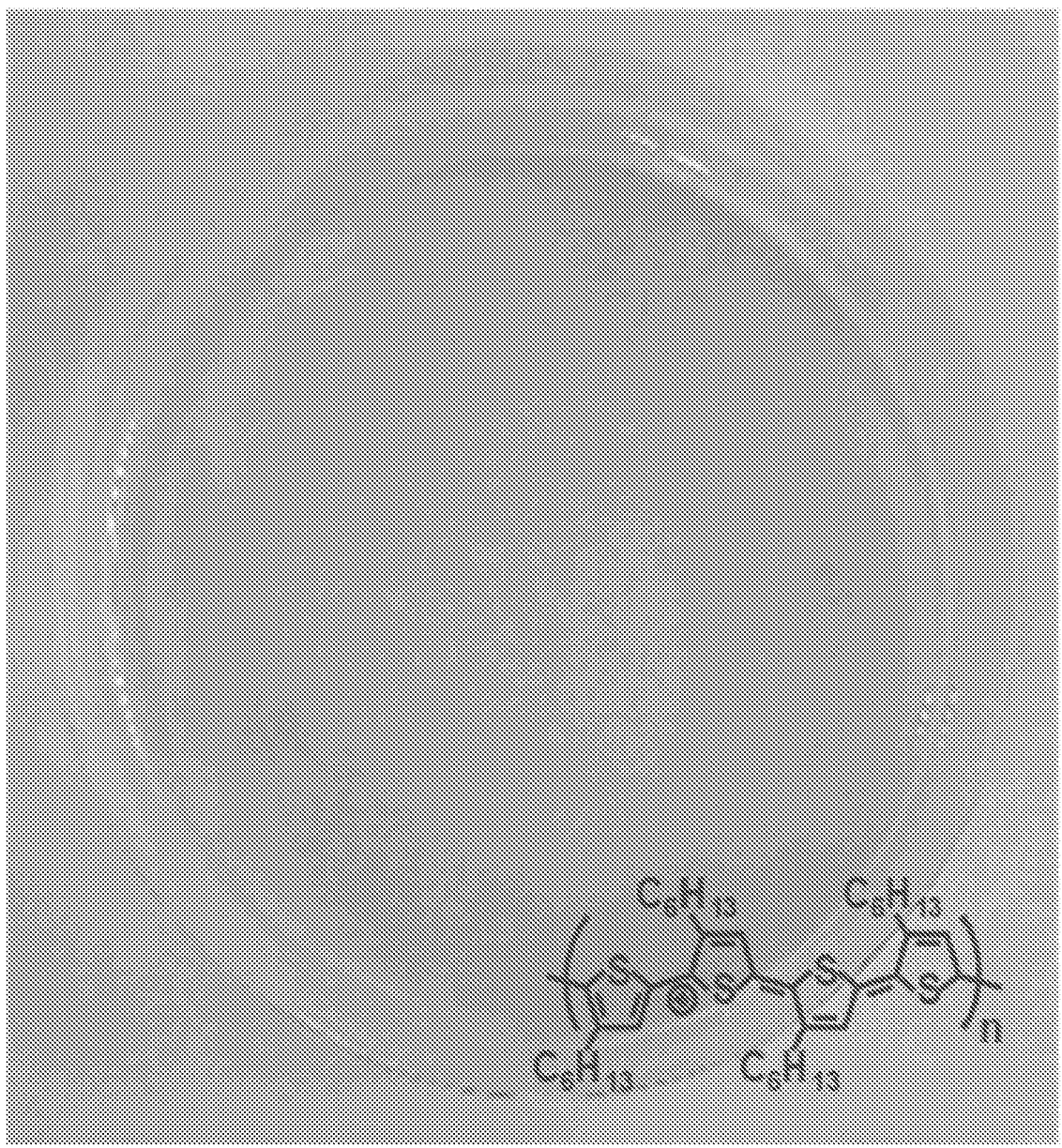

[FIG. 1F]
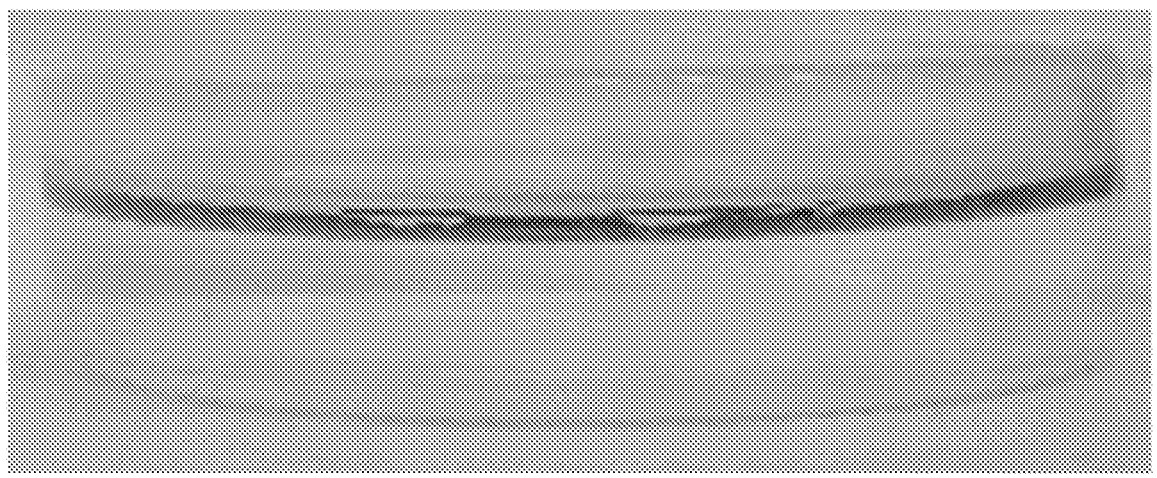
[FIG. 1G]
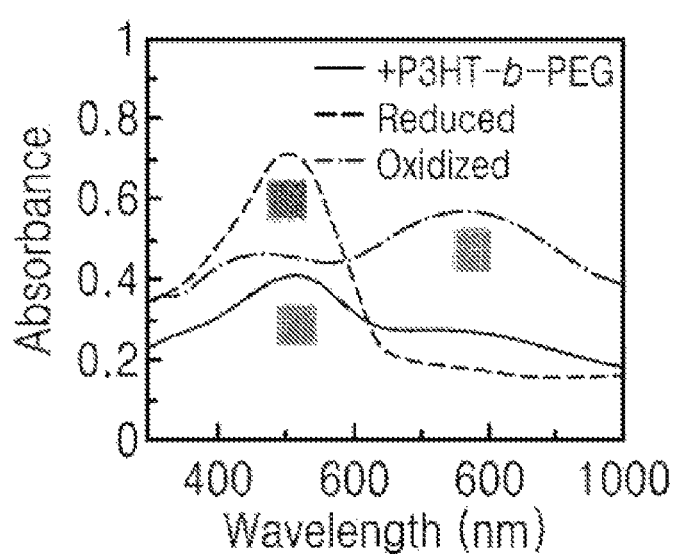

[FIG. 1H]
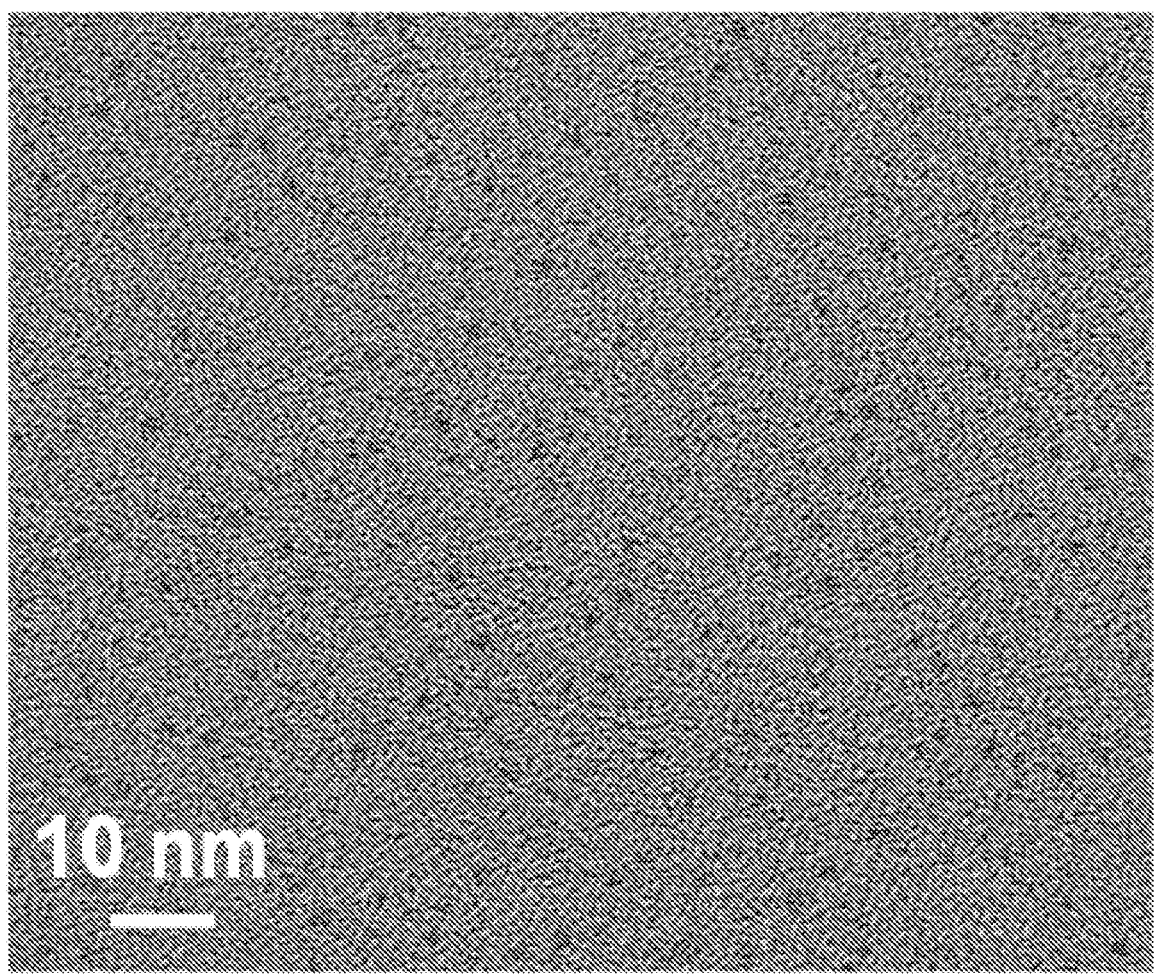
[FIG. 1I]

[FIG. 1J]
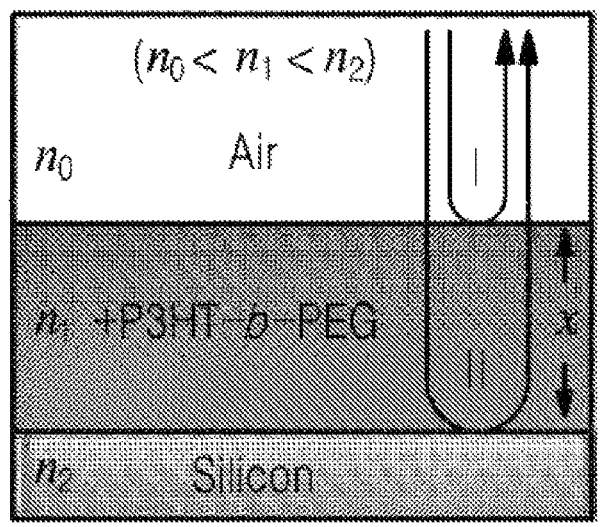

[FIG. 2A]
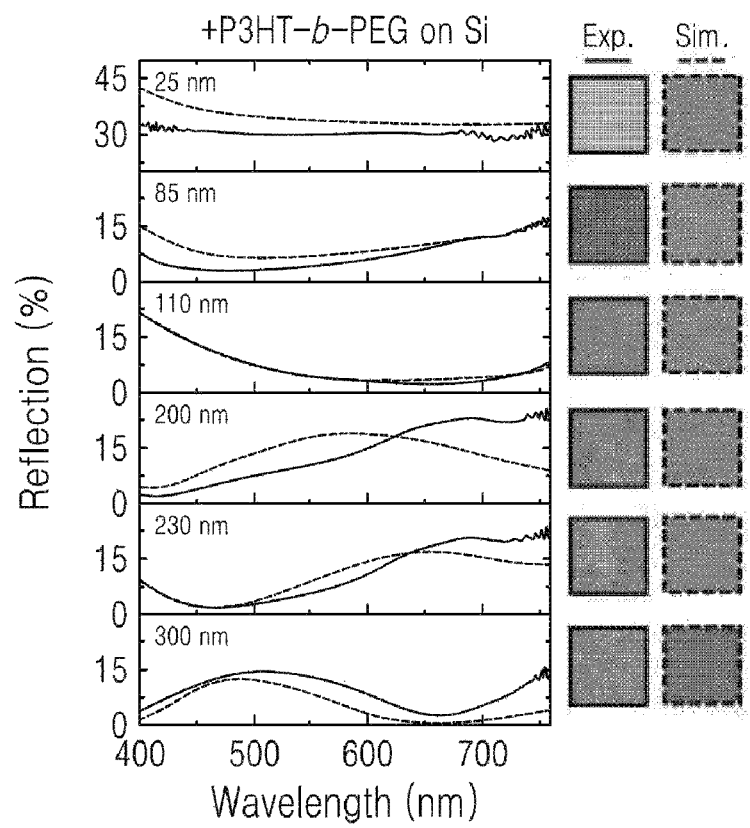
[FIG. 2B]
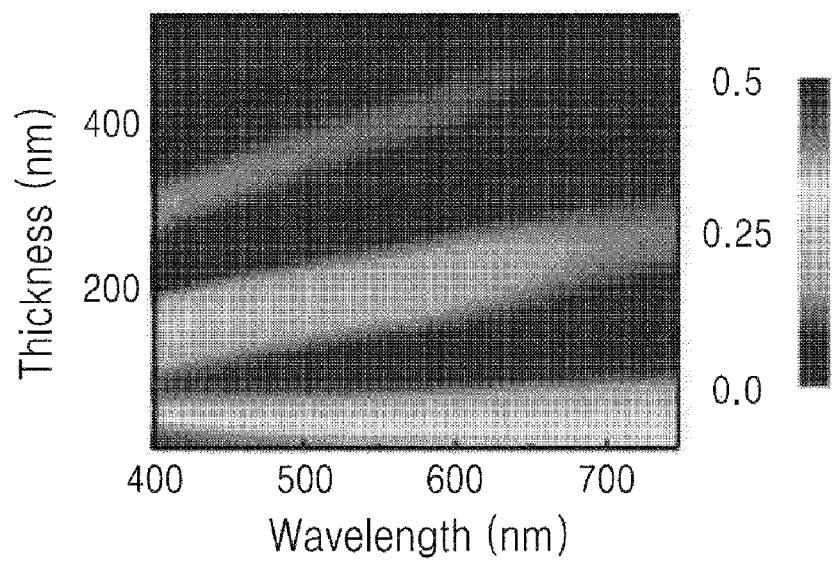

[FIG. 3A]
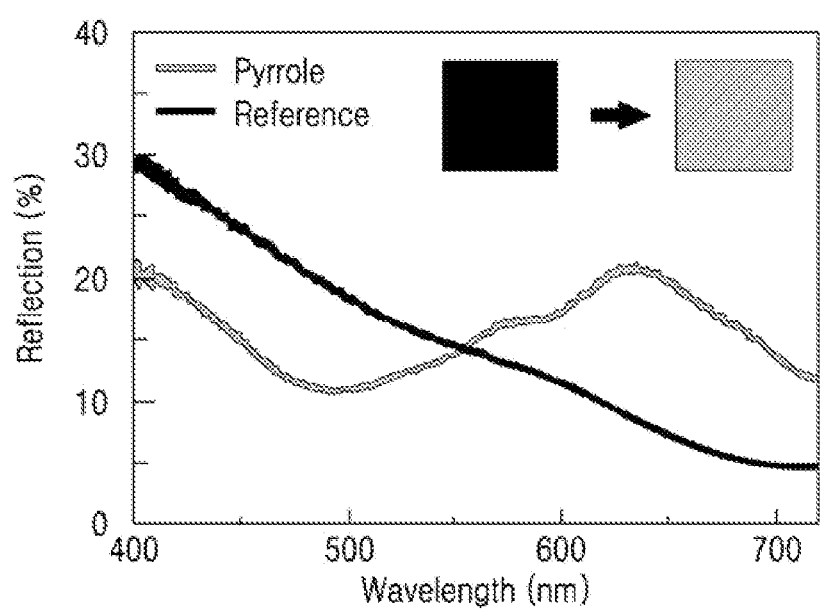

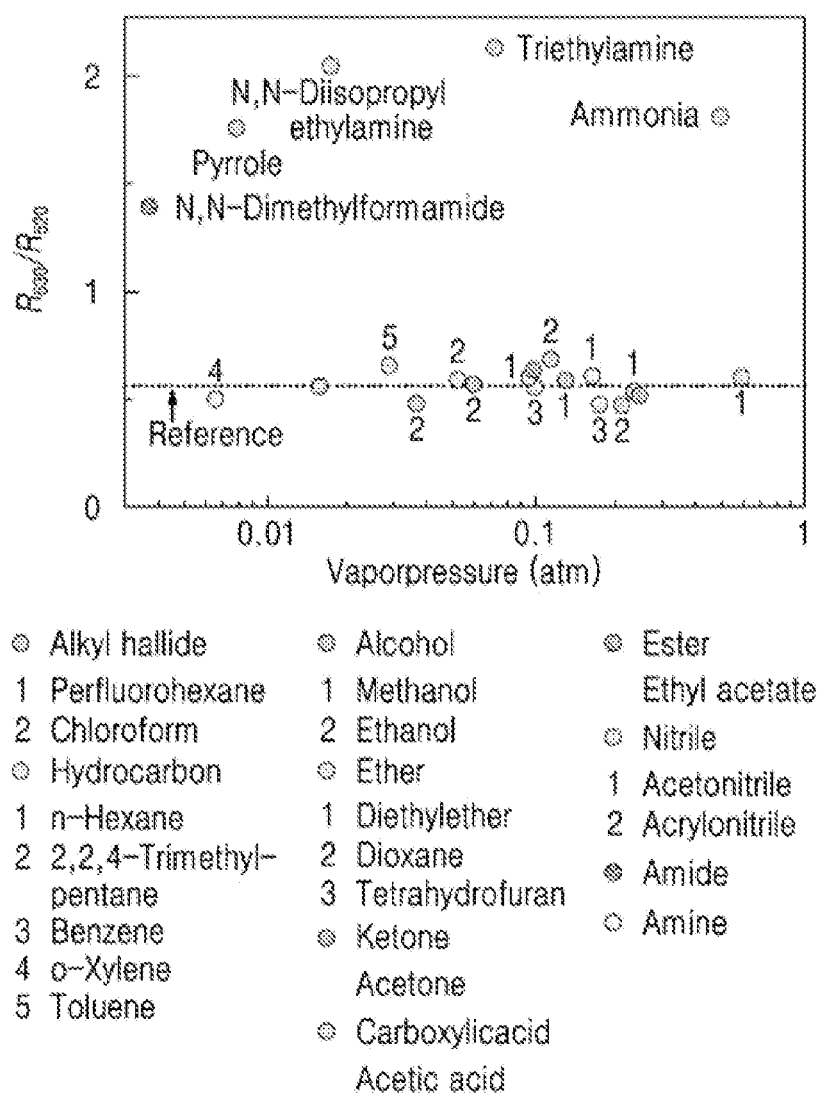
[FIG. 3B]

[FIG. 4A]
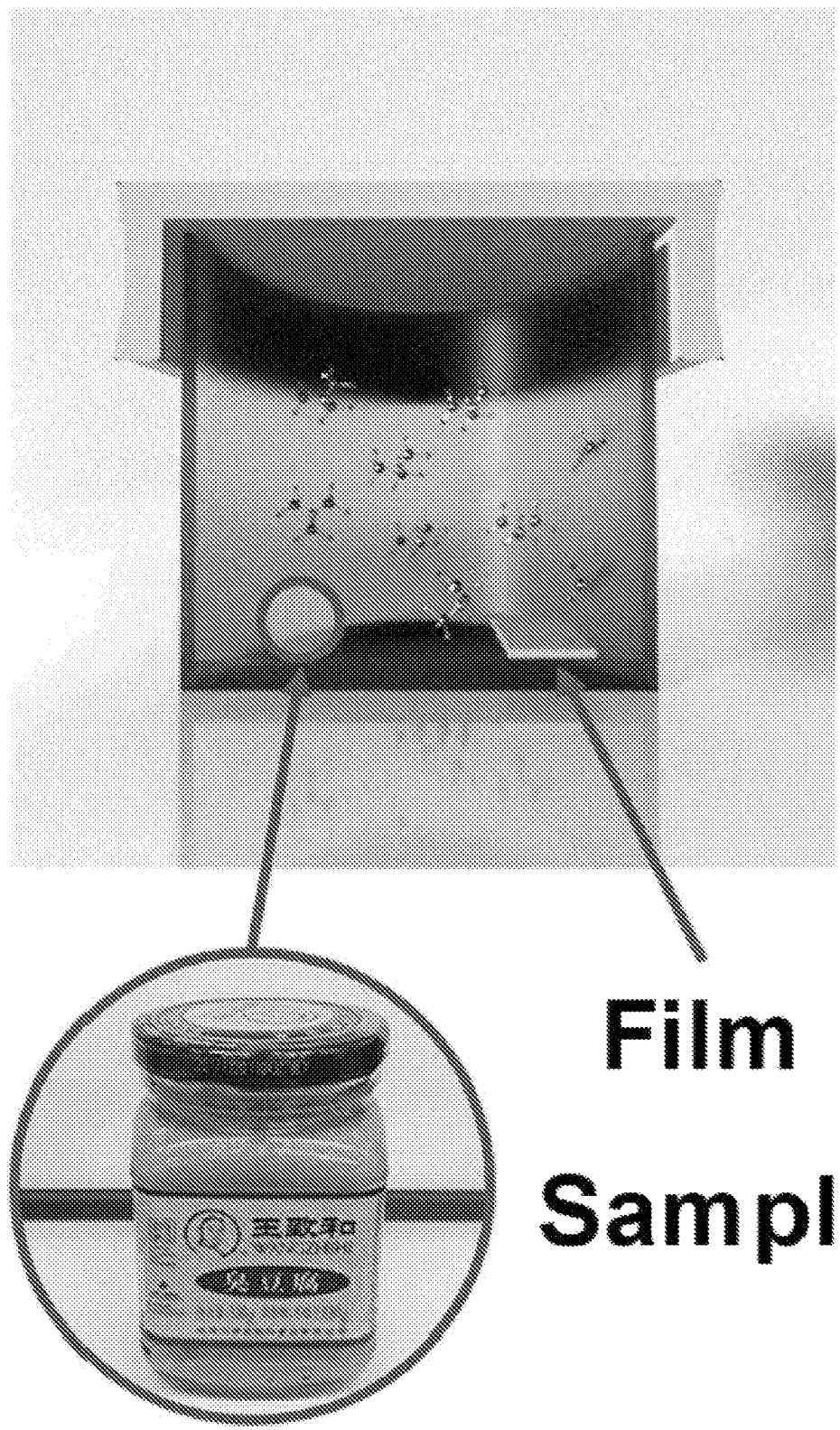

[FIG. 4B]
+P3HT-b-PEG
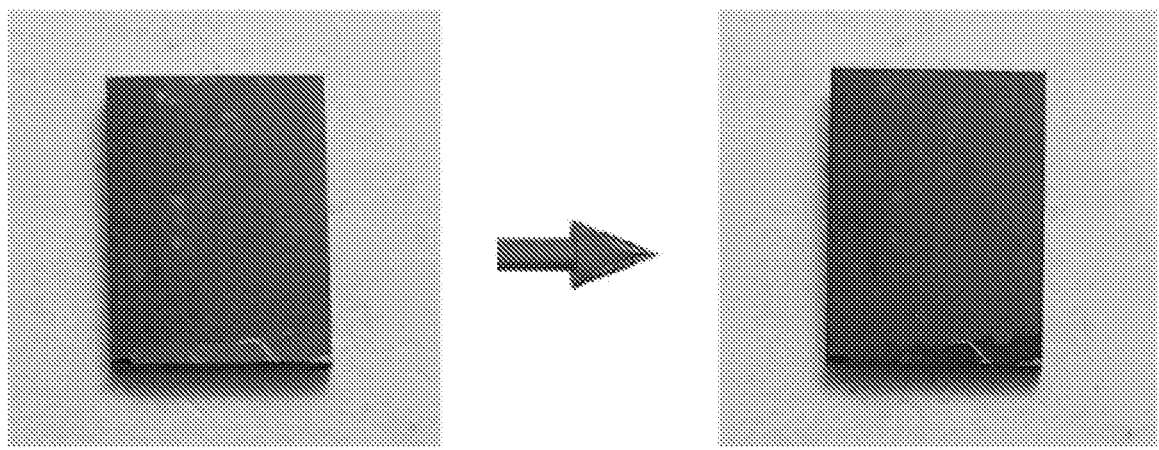
[FIG. 4C]
+P3HT-b-PEG
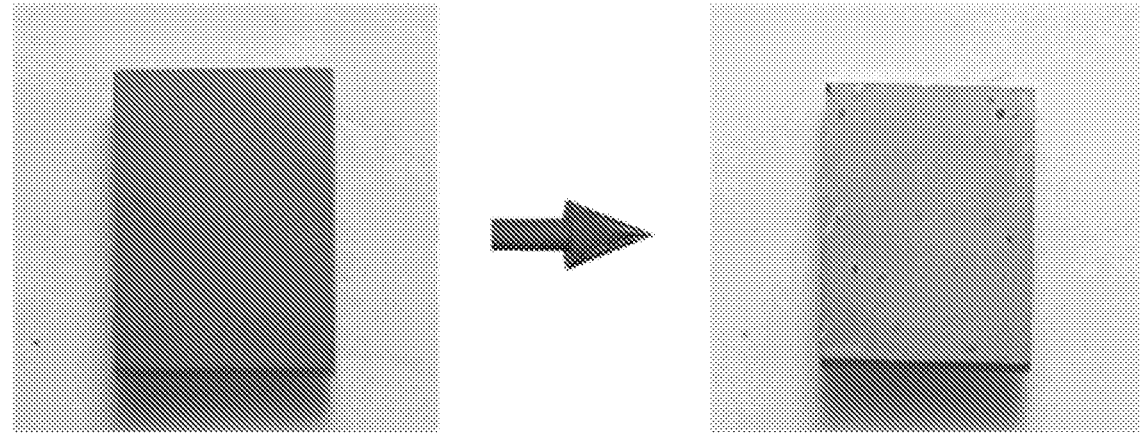

[FIG. 4D]
P3HT
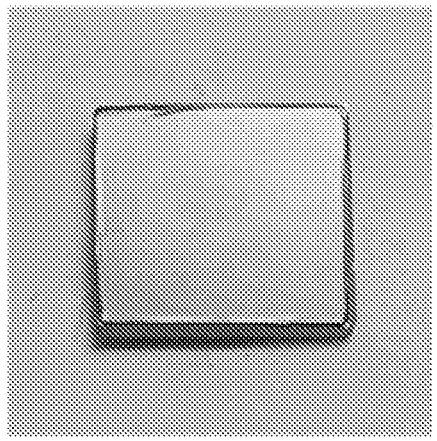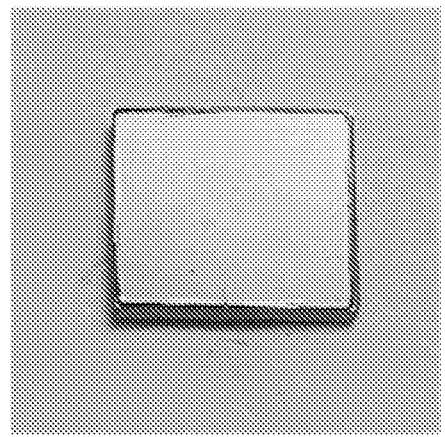

[FIG. 4E]
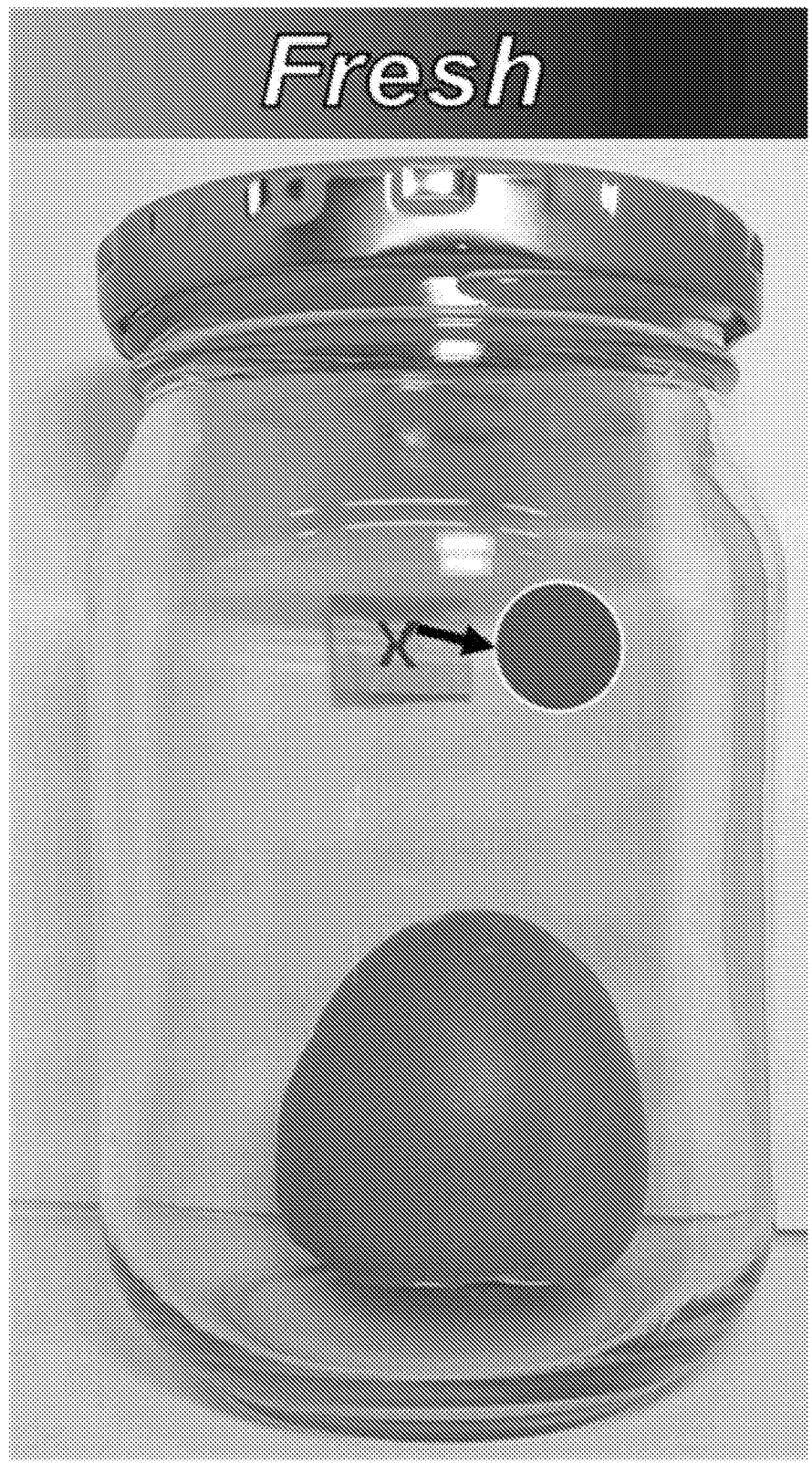

[FIG. 4F]
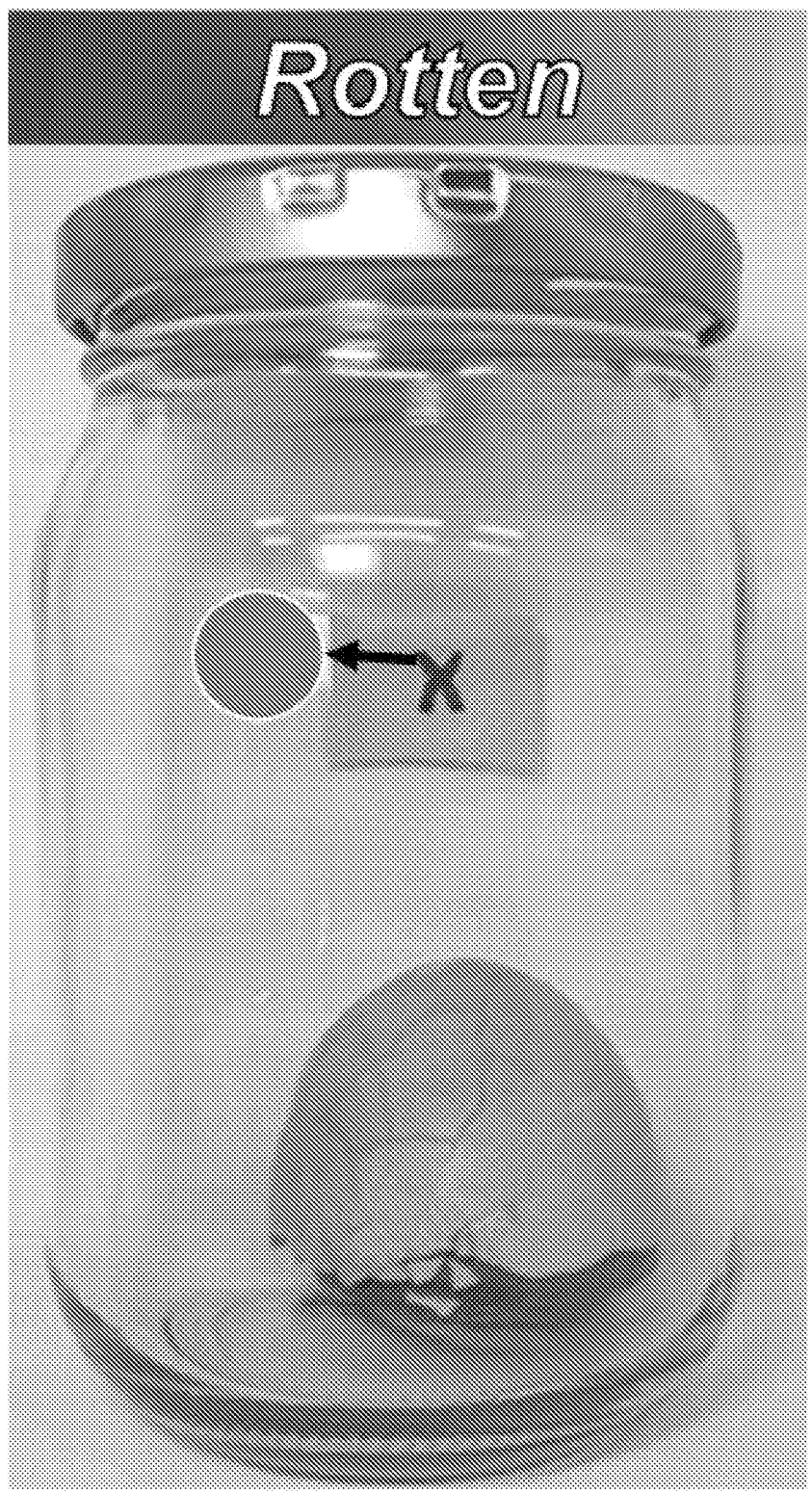

[FIG. 4G]
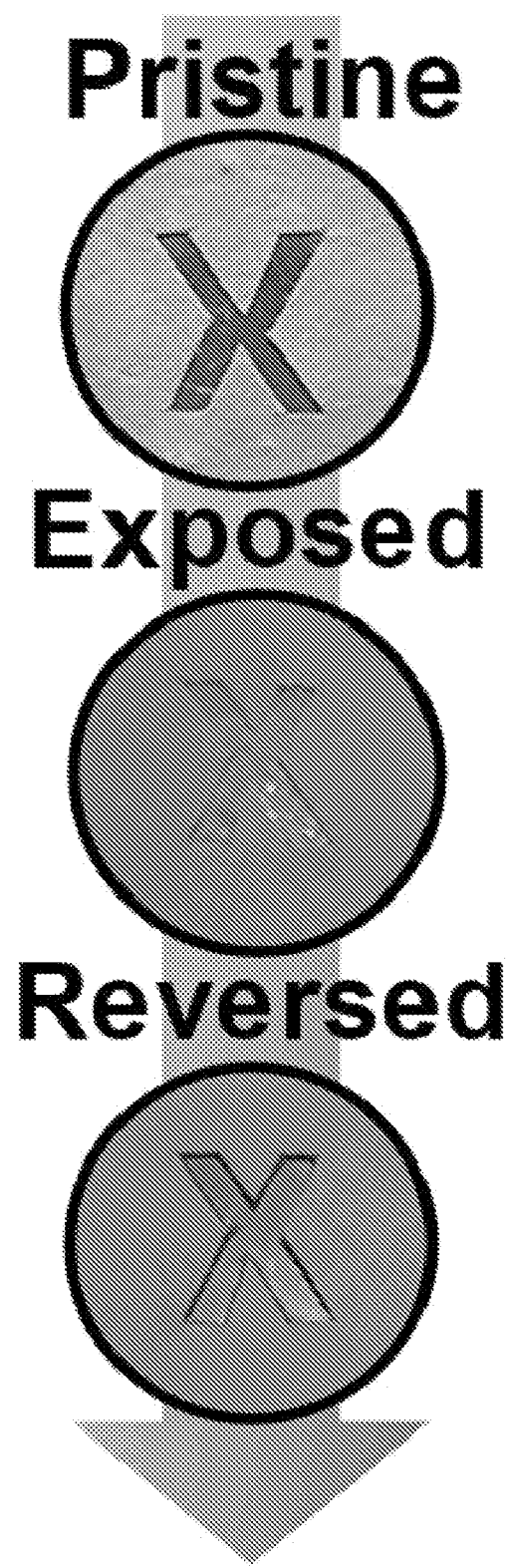

[FIG. 5]
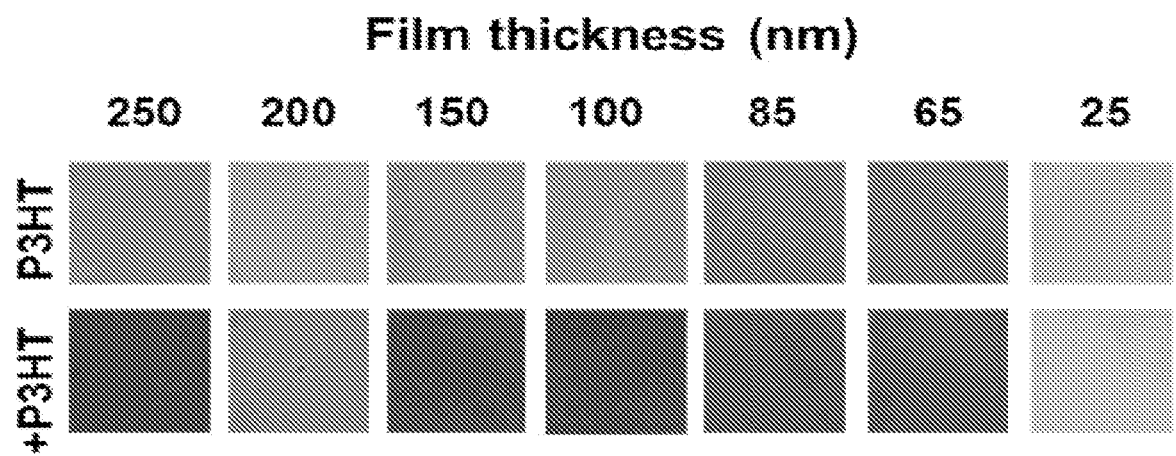

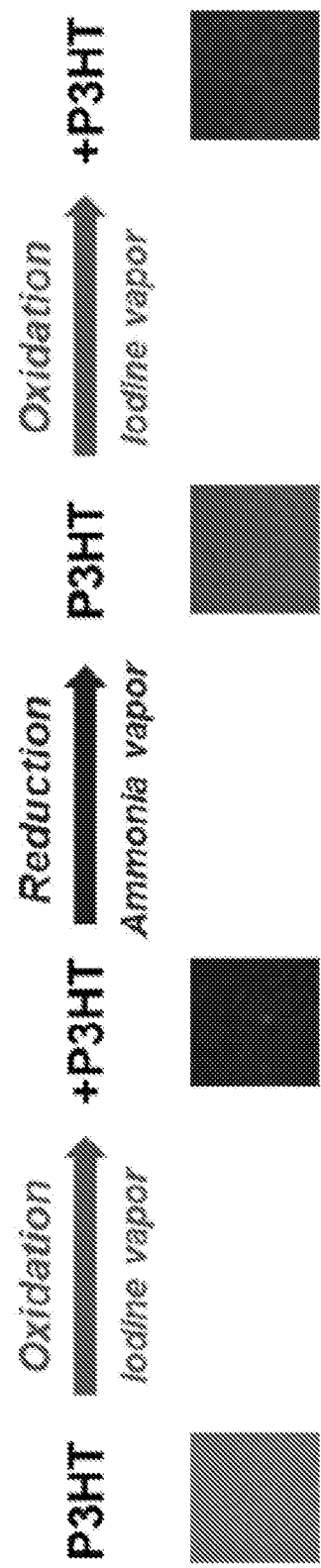
[FIG. 6]

[FIG. 7]
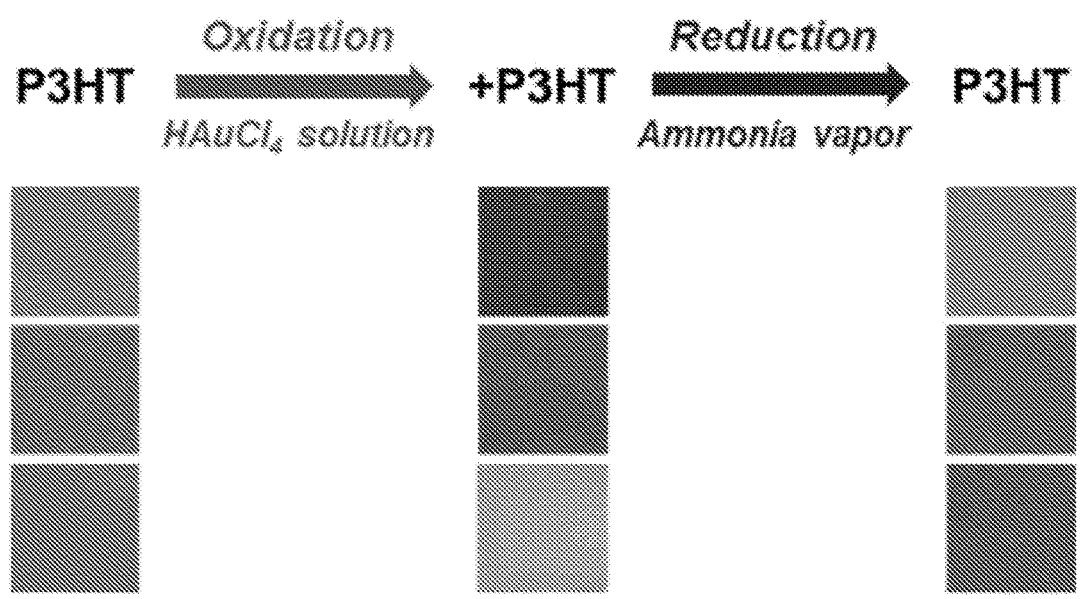

SENSITIVE CONJUGATED POLYMER STRUCTURE COLOR AND SENSOR USING SAME

CROSS-REFERENCE TO RELATED APPLICATIONS

This application is a continuation of PCT Application No. PCT/KR2021/008511, filed on Jul. 5, 2021, which claims priority to Korean Patent Application Number 10-2020-0088139, filed on Jul. 16, 2020, both of which are hereby incorporated by reference in their entirety.

TECHNICAL FIELD

The present disclosure relates to a responsive polymer film, a method of preparing the responsive polymer film, and a sensor using the polymer film.

BACKGROUND

Olfaction, the sense of smell, is one of our five senses and provides rich information about our surroundings by analyzing airborne chemicals. Naturally, artificial olfactory technology has emerged as a replacement for the human nose in a wide range of applications such as hazard identification, disease detection, and chemical and biological process monitoring. While artificial olfaction generally adopts electrical devices as sensor elements, more accessible colorimetry, which can provide intuitive signal readouts, is beneficial for performing fast and efficient diagnostics by end users.

One way to achieve such a technology is to design structural colors responsive to gaseous chemicals. For a change in structure color to occur, either a change in the geometry or the refractive index contrast between the structure and surroundings must occur. Of the two routes, change in the geometry is the dominant method particularly using stimuli-responsive hydrogels structurally linked to photonic crystals. In this case, swelling or deswelling of the hydrogels in response to the changes in a chemical environment modifies the geometrical parameters of the photonic crystals and thus changes the structural color. In comparison, studies exploiting changes in refractive index in different chemical environments have been less common due to the lack of candidate materials with chemically responsive dielectric properties. A representative approach based on the refractive index change relies on porous materials, whose effective refractive indexes change with the penetration of chemical species, and thus exhibits various structural colors in different chemical environments. In another approach using more specific chemical reactions, dynamic color display was recently demonstrated based on structural color changes caused by the hydrogenation and dehydrogenation of a magnesium metasurface. However, the preparation of plasmonic nanoarrays using reactive metals such as magnesium requires expensive and complex lithographic techniques.

PRIOR ART DOCUMENT

Japan Patent Publication No. 6654319.

DISCLOSURE OF THE INVENTION

Problems to be Solved by the Invention

The present disclosure provides a responsive polymer film, a method of preparing the responsive polymer film, and a sensor using the polymer film.

However, problems to be solved by the present disclosure are not limited to the above-described problems. Although not described herein, other problems to be solved by the present disclosure can be clearly understood by a person with ordinary skill in the art from the following description.

Means for Solving the Problems

A first aspect of the present disclosure provides a responsive polymer film, including at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

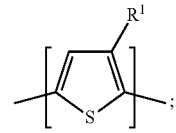

[Chemical Formula 1]

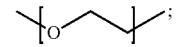

[Chemical Formula 2]

in the above Chemical Formula 1,
$R^1$ is a linear or branched alkyl group having 1 to 8 carbon atoms.

A second aspect of the present disclosure provides a method of preparing a responsive polymer film, including obtaining a responsive polymer film including at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

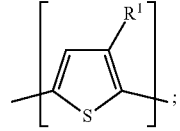

[Chemical Formula 1]

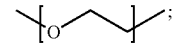

[Chemical Formula 2]

in the above Chemical Formula 1,
$R^1$ is a linear or branched alkyl group having 1 to 8 carbon atoms.

A third aspect of the present disclosure provides a sensor, including a responsive polymer film of the first aspect.

Effects of the Invention

A responsive polymer film and a sensor including the same according to embodiments of the present disclosure can implement chemically responsive structural colors based on thin-film interference caused by charge modulation of a polaronic conjugated polymer. In particular, since a homogeneous film with a uniform thickness has chemical responsiveness, it is possible to provide chemically responsive colors from thin-film interference. Further, the responsive polymer film can show drastic changes in variable structural colors upon exposure to a reductive/oxidative vapor or gas, or solution with respect to the charge modulation and corresponding index changes. These responsive structural colors provide a new platform for an artificial olfactory system with high accessibility, mechanical flexibility and multicolor tunability.

According to a method of preparing a responsive polymer film according to the embodiments of the present disclosure, it is possible to prepare a polymer film that is flexible, transferable and highly homogeneous in thickness over a large area. Also, it is easy to prepare and also economical.

Structural colors responsive to the chemical environment can form the basis for simple and highly accessible diagnostic tools. Herein, the charge modulation of conjugated polymers is demonstrated as a new mechanism for chemically responsive structural colors based on thin-film interference. A liquid-liquid interfacial self-assembly is used to generate a conjugated homopolymer and/or block copolymer film that is flexible, transferable and highly homogeneous in thickness over a large area. Metal ions are introduced in a self-assembly process for in-situ oxidation of conjugated polymers into a hole-polaronic state in which the polymer film is rendered responsive to the chemical environment. When transferred onto a silicon (Si) wafer, the film shows thickness-dependent tunable reflective colors due to optical interference. Furthermore, the film undergoes drastic changes in its dielectric behavior due to switching of the polaronic state through oxidation and reduction and thus enables large modulations of interference colors. These responsive structural colors, in turn, can be used as simple and intuitive multicolor readout for recognition of a reductive vapor including biological decomposition products.

BRIEF DESCRIPTION OF THE DRAWINGS

FIGS. 1A to 1J show preparation of polaronic P3HT-b-PEG(+P3HT-b-PEG) films by liquid-liquid interfacial self-assembly (LISA) and their characteristics according to examples of the present disclosure. FIG. 1A is a schematic diagram showing LISA of +P3HT-b-PEG between a toluene solution of P3HT-b-PEG and an aqueous solution of $HAuCl_4$, and FIG. 1B is a schematic diagram showing a transfer method of the +P3HT-b-PEG film onto a solid substrate. Also, FIGS. 1C to 1F are photographs of the experimental setup taken in the beginning stage (FIGS. 1C and 1D) and the final stage (FIGS. 1E and 1F) of the self-assembly, FIG. 1G shows extinction spectra of the as-prepared, electrochemically reduced and oxidized +P3HT-b-PEG films, and insets show photographs of the corresponding films on ITO-coated glass. FIG. 1H is a TEM image of the +P3HT-b-PEG film, showing the formation of Au nanoparticles within the film, FIG. 1I shows distinct reflective colors (gray (30 nm), purple (80 nm), blue (110 nm), light blue (130 nm), gray green (160 nm), yellow (210 nm), red (240 nm)) from +P3HT-b-PEG films with various film thicknesses placed on an Si wafer, and FIG. 1J is a schematic diagram showing the coloration principle of the +P3HT-b-PEG film on an Si wafer via thin-film interference.

FIGS. 2A and 2B show structural colors of +P3HT-b-PEG films on Si according to examples of the present disclosure. FIG. 2A shows a series of measured and calculated reflection spectra (left) and corresponding colors (gray (25 nm), purple (85 nm), blue (110 nm), yellow (200 nm), red (230 nm), green (300 nm)) (right) of the +P3HT-b-PEG films with different thicknesses on Si. Herein, solid and dotted lines represent measured and calculated data, respectively. FIG. 2B shows calculated reflection as a function of film thickness and wavelength.

FIGS. 3A and 3B show optical response of +P3HT-b-PEG films exposed to a chemical vapor according to examples of the present disclosure. FIG. 3A shows reflection spectra of the +P3HT-b-PEG films before (labeled as the reference, black line) and after (gray line) exposure to a pyrrole vapor for 60 minutes. Insets show photographs of the films before (blue) and after exposure to pyrrole vapor (gray). FIG. 3B shows the ratio of reflection at 630 nm and 520 nm ($R_{630}/R_{520}$) of the +P3HT-b-PEG films exposed to various chemical vapors, and the ratio of reflection for the reference is indicated with a dotted line for comparison and blue-colored 125 nm thick +P3HT-b-PEG films on Si were used for all experiments.

FIGS. 4A to 4G show color changes upon exposure to food products according to examples of the present disclosure. FIG. 4A, shows the experimental setup for inducing responsive color changes in +P3HT-b-PEG films on Si upon exposure to odors from fermented tofu, and FIGS. 4B to 4D show a 110 nm thick +P3HT-b-PEG film (blue, FIG. 4B), a 160 nm thick +P3HT-b-PEG film (green, FIG. 4C), and a 370 nm thick +P3HT-b-PEG film (yellow, FIG. 4D) before and after exposure to fermented tofu. Also, FIGS. 4E and 4F show the flexible +P3HT-b-PEG films on PET/Ti/Pt films beneath "X"-shaped masks enclosed with a normal egg and a rotten boiled egg in sealed jars, respectively. The colored circle displays the color of the film. FIG. 4G is close-up photographs of the responsive film in pristine (blue), exposed (red) and reversed (blue) states.

FIG. 5 shows the colors of polymer films (P3HT, +P3HT), which were prepared by spin-coating according to examples of the present disclosure, depending on the thickness (P3HT: green yellow (250 nm), light yellow (200 nm), yellow (150 nm), green yellow (100 nm), green (85 nm), blue green (65 nm), light blue (25 nm), +P3HT: dark green (250 nm), light blue (200 nm), blue (150 nm), purple (100 nm)), light purple (85 nm), brown (65 nm), light brown (25 nm)).

FIG. 6 shows changes in structural colors of films (P3HT: yellow, +P3HT: purple) when P3HT films exposed to an iodine vapor and an ammonia vapor, which are oxidative/reductive vapors, according to examples of the present disclosure.

FIG. 7 shows changes in structural colors of films (yellow-purple-yellow, green-brown-green, light blue-light brown-blue) when P3HT films with various thicknesses are exposed to a $HAuCl_4$ solution, which is an oxidative solution, and an ammonia vapor, which is a reductive vapor, according to examples of the present disclosure.

BEST MODE FOR CARRYING OUT THE INVENTION

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to"

another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Through the whole document, the term "alkyl" or "alkyl group" includes a linear or branched alkyl group having 1 to 12 carbon atoms, 1 to 10 carbon atoms, 1 to 8 carbon atoms, or 1 to 5 carbon atoms and all the possible isomers thereof. For example, the alkyl or alkyl group may include a methyl group (Me), an ethyl group (Et), a n-propyl group ($^n$Pr), an iso-propyl group ($^i$Pr), a n-butyl group ($^n$Bu), an iso-butyl group ($^i$Bu), a tert-butyl group ($^t$Bu), a sec-butyl group ($^{sec}$Bu), a n-pentyl group ($^n$Pe), an iso-pentyl group ($^{iso}$Pe), a sec-pentyl group ($^{sec}$Pe), a tert-pentyl group ($^t$Pe), a neo-pentyl group ($^{neo}$Pe), a 3-pentyl group, a n-hexyl group, an iso-hexyl group, a heptyl group, a 4,4-dimethyl pentyl group, an octyl group, a 2,2,4-trimethyl pentyl group, a nonyl group, a decyl group, an undecyl group, a dodecyl group, and isomers thereof, but may not be limited thereto.

Hereinafter, embodiments of the present disclosure have been described in detail, but the present disclosure may not be limited thereto.

A first aspect of the present disclosure provides a responsive polymer film, including at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

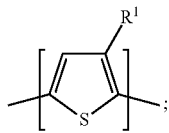

[Chemical Formula 1]

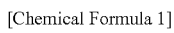

[Chemical Formula 2]

in the above Chemical Formula 1, $R^1$ is a linear or branched alkyl group having 1 to 8 carbon atoms.

In an embodiment of the present disclosure, $R^1$ may be selected from the group consisting of a methyl group, an ethyl group, a propyl group, a butyl group, a pentyl group, a hexyl group, a heptyl group, an octyl group and all possible isomers thereof, but may not be limited thereto.

In an embodiment of the present disclosure, the homopolymer including the monomer represented by Chemical Formula 1 may be prepared by polymerization of about 10 to about 500 monomers, but may not be limited thereto. For example, the homopolymer may be prepared by polymerization of about 10 to about 500 monomers, about 10 to about 450 monomers, about 10 to about 400 monomers, about 10 to about 350 monomers, about 10 to about 300 monomers, about 10 to about 250 monomers, about 10 to about 200 monomers, about 10 to about 150 monomers, about 10 to about 100 monomers, about 10 to about 90 monomers, about 10 to about 80 monomers, about 10 to about 70 monomers, about 10 to about 60 monomers, about 10 to about 50 monomers, about 10 to about 40 monomers, about 20 to about 500 monomers, about 20 to about 450 monomers, about 20 to about 400 monomers, about 20 to about 350 monomers, about 20 to about 300 monomers, about 20 to about 250 monomers, about 20 to about 200 monomers, about 20 to about 150 monomers, about 20 to about 100 monomers, about 20 to about 90 monomers, about 20 to about 80 monomers, about 20 to about 70 monomers, about 20 to about 60 monomers, about 20 to about 50 monomers, or about 20 to about 40 monomers, but may not be limited thereto. In an embodiment of the present disclosure, the homopolymer including the monomer represented by Chemical Formula 1 may be prepared by polymerization of about 20 to about 40 monomers.

In an embodiment of the present disclosure, a block copolymer including a monomer represented by Chemical Formula 1 and a monomer represented by Chemical Formula 2 may be prepared by polymerization of about 10 to about 500 monomers represented by Chemical Formula 1, and may be prepared by polymerization of about 5 to about 250 monomers represented by Chemical Formula 2, but may not be limited thereto. For example, the block copolymer may be prepared by polymerization of about 10 to about 500 monomers, about 10 to about 450 monomers, about 10 to about 400 monomers, about 10 to about 350 monomers, about 10 to about 300 monomers, about 10 to about 250 monomers, about 10 to about 200 monomers, about 10 to about 150 monomers, about 10 to about 100 monomers, about 10 to about 90 monomers, about 10 to about 80 monomers, about 10 to about 70 monomers, about 10 to about 60 monomers, about 10 to about 50 monomers, about 10 to about 40 monomers, about 20 to about 500 monomers, about 20 to about 450 monomers, about 20 to about 400 monomers, about 20 to about 350 monomers, about 20 to about 300 monomers, about 20 to about 250 monomers, about 20 to about 200 monomers, about 20 to about 150 monomers, about 20 to about 100 monomers, about 20 to about 90 monomers, about 20 to about 80 monomers, about 20 to about 70 monomers, about 20 to about 60 monomers, about 20 to about 50 monomers, or about 20 to about 40 monomers represented by Chemical Formula 1, and may be prepared by polymerization of about 5 to about 250 monomers, about 5 to about 250 monomers, about 5 to about 200 monomers, about 5 to about 150 monomers, about 5 to about 100 monomers, about 5 to about 90 monomers, about 5 to about 80 monomers, about 5 to about 70 monomers, about 5 to about 60 monomers, about 5 to about 50 monomers, about 5 to about 40 monomers, about 5 to about 30 monomers, about 5 to about 20 monomers, about 10 to about 250 monomers, about 10 to about 200 monomers, about 10 to about 150 monomers, about 10 to about 100 monomers, about 10 to about 90 monomers, about 10 to about 80 monomers, about 10 to about 70 monomers, about 10 to about 60 monomers, about 10 to about 50 monomers, about 10 to about 40 monomers, about 10 to about 30 monomers, or about 10 to about 20 monomers represented by Chemical Formula 2, but may not be limited thereto.

In an embodiment of the present disclosure, a block copolymer including monomers represented by Chemical Formula 1 may be prepared by polymerization of about 20 to about 40 monomers represented by Chemical Formula 1, and may be prepared by polymerization of about 10 to about 20 monomers represented by Chemical Formula 2.

In an embodiment of the present disclosure, the polymer film may be a polaronic conjugated, P3HT homopolymer or P3HT-b-PEG block copolymer.

In an embodiment of the present disclosure, the responsive polymer film may include metal nanoparticles uniformly embedded within the responsive polymer film, but may not be limited thereto. In an embodiment of the present disclosure, the metal nanoparticles may be at least one selected from gold, silver, iron, copper, nickel, and manganese, but may not be limited thereto.

In an embodiment of the present disclosure, the metal nanoparticles may be gold nanoparticles.

In an embodiment of the present disclosure, the responsive polymer film may exhibits a different structural color depending on the oxidation-reduction state and/or thickness. Herein, the refractive index or polarization index of the responsive polymer film may vary depending on the oxidation-reduction state of the polymer film.

In an embodiment of the present disclosure, a thickness of the responsive polymer film may be about 20 nm to about 400 nm, but may not limited thereto. For example, a thickness of the responsive polymer film may be about 20 nm to about 400 nm, about 20 nm to about 350 nm, about 20 nm to about 300 nm, about 20 nm to about 250 nm, about 20 nm to about 200 nm, about 20 nm to about 150 nm, about 20 nm to about 100 nm, about 20 nm to about 90 nm, about 20 nm to about 80 nm, about 20 nm to about 70 nm, about 20 nm to about 60 nm, about 20 nm to about 50 nm, about 20 nm to about 40 nm, about 20 nm to about 30 nm, about 30 nm to about 400 nm, about 30 nm to about 350 nm, about 30 nm to about 300 nm, about 30 nm to about 250 nm, about 30 nm to about 200 nm, about 30 nm to about 150 nm, about 30 nm to about 100 nm, about 30 nm to about 90 nm, about 30 nm to about 80 nm, about 30 nm to about 70 nm, about 30 nm to about 60 nm, about 30 nm to about 50 nm, about 30 nm to about 40 nm, about 40 nm to about 400 nm, about 40 nm to about 350 nm, about 40 nm to about 300 nm, about 40 nm to about 250 nm, about 40 nm to about 200 nm, about 40 nm to about 150 nm, about 40 nm to about 100 nm, about 40 nm to about 90 nm, about 40 nm to about 80 nm, about 40 nm to about 70 nm, about 40 nm to about 60 nm, about 40 nm to about 50 nm, about 50 nm to about 400 nm, about 50 nm to about 350 nm, about 50 nm to about 300 nm, about 50 nm to about 250 nm, about 50 nm to about 200 nm, about 50 nm to about 150 nm, about 50 nm to about 100 nm, about 50 nm to about 90 nm, about 50 nm to about 80 nm, about 50 nm to about 70 nm, about 50 nm to about 60 nm, about 60 nm to about 400 nm, about 60 nm to about 350 nm, about 60 nm to about 300 nm, about 60 nm to about 250 nm, about 60 nm to about 200 nm, about 60 nm to about 150 nm, about 60 nm to about 100 nm, about 60 nm to about 90 nm, about 60 nm to about 80 nm, about 60 nm to about 70 nm, about 70 nm to about 400 nm, about 70 nm to about 350 nm, about 70 nm to about 300 nm, about 70 nm to about 250 nm, about 70 nm to about 200 nm, about 70 nm to about 150 nm, about 70 nm to about 100 nm, about 70 nm to about 90 nm, about 70 nm to about 80 nm, about 80 nm to about 400 nm, about 80 nm to about 350 nm, about 80 nm to about 300 nm, about 80 nm to about 250 nm, about 80 nm to about 200 nm, about 80 nm to about 150 nm, about 80 nm to about 100 nm, about 80 nm to about 90 nm, about 90 nm to about 400 nm, about 90 nm to about 350 nm, about 90 nm to about 300 nm, about 90 nm to about 250 nm, about 90 nm to about 200 nm, about 90 nm to about 150 nm, about 90 nm to about 100 nm, about 100 nm to about 400 nm, about 100 nm to about 350 nm, about 100 nm to about 300 nm, about 100 nm to about 250 nm, about 100 nm to about 200 nm, about 100 nm to about 150 nm, about 150 nm to about 400 nm, about 150 nm to about 350 nm, about 150 nm to about 300 nm, about 150 nm to about 250 nm, about 150 nm to about 200 nm, about 200 nm to about 400 nm, about 200 nm to about 350 nm, about 200 nm to about 300 nm, about 200 nm to about 250 nm, about 250 nm to about 400 nm, about 250 nm to about 350 nm, about 250 nm to about 300 nm, about 300 nm to about 400 nm, about 300 nm to about 350 nm, or about 350 nm to about 400 nm, but may not be limited thereto.

In an embodiment of the present disclosure, a new type of dynamic structural color can be designed and prepared by adopting a chemically-responsive polaronic conjugated polymer in a simple thin-film interference device. A single dielectric thin film on a high-index substrate is one of the most elementary structural color designs and provides strong advantages in terms of ease of preparation, implementation, cost and mechanical flexibility especially when coupled to polymeric dielectrics. To provide chemically responsive colors from basic thin-film interference, two conditions need to be met. One is the preparation of a homogeneous film with a uniform thickness. The other condition requires incorporating responsive chemical functionality to the film. In an embodiment of the present disclosure, these two conditions were achieved by adopting liquid-liquid interfacial self-assembly (LISA) and in-situ oxidation of a conjugated homopolymer, poly(3-hexylthiophene), or a conjugated block copolymer, poly(3-hexylthiophene)-block-poly(ethylene glycol) (P3HT-b-PEG), which prepares uniform polaronic P3HT films (hereinafter, also referred to as "+P3HT") that show sensitivity to redox processes in a controlled manner. A large variety of visible coloration can be achieved with +P3HT and +P3HT-b-PEG having different film thicknesses through thin-film optical interference. Also, the polaronic polymer film can show drastic changes in variable structural colors upon exposure to a reductive/oxidative vapor or gas, or a solution with respect to the charge modulation and corresponding index changes. These responsive structural colors provide a new platform for artificial olfactory system with high accessibility, mechanical flexibility and multicolor tunability.

A second aspect of the present disclosure provides a method of preparing a responsive polymer film, including obtaining a responsive polymer film including at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

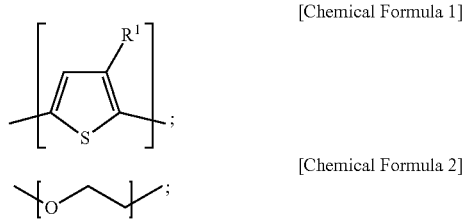

[Chemical Formula 1]

[Chemical Formula 2]

in the above Chemical Formula 1, $R^1$ is a linear or branched alkyl group having 1 to 8 carbon atoms.

Detailed descriptions of the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, $R^1$ may be selected from the group consisting of a methyl group, an ethyl group, a propyl group, a butyl group, a pentyl group, a hexyl group, a heptyl group, an octyl group and all possible isomers thereof, but may not be limited thereto.

In an embodiment of the present disclosure, the polymer film may be a polaronic conjugated, P3HT homopolymer, or P3HT-b-PEG block copolymer.

In an embodiment of the present disclosure, the method of preparing a responsive film polymer film may include spin-coating or liquid-liquid interfacial self-assembly, but may not be limited thereto.

In an embodiment of the present disclosure, when the responsive polymer film is prepared by the liquid-liquid interfacial self-assembly, the responsive polymer film may be prepared at the interface between a reactive solution including at least one of the homopolymer and the block copolymer and an aqueous solution including metal ion, but may not be limited thereto. Herein, the metal ion may be at least one selected from gold, silver, iron, copper, nickel and manganese, but may not be limited thereto. In an embodiment of the present disclosure, when the responsive polymer film is prepared by the liquid-liquid interfacial self-assembly, the responsive polymer film may be prepared at the interface between a reactive solution including at least one of the homopolymer and the block copolymer and an aqueous solution including gold ion. Herein, the metal ions cause in-situ oxidation of the conjugated polymers. Accordingly, the solubility of the polymers is changed, which results in spontaneous deposition of the responsive polymer film without any postprocesses.

In an embodiment of the present disclosure, the reactive solution is prepared by dissolving at least one of the homopolymer and the block copolymer in an organic solvent, and the organic solvent may be selected from toluene, dichlorobenzene, tetrahydrofuran and chloroform, but may not be limited thereto. In an embodiment of the present disclosure, the organic solvent may be toluene.

In an embodiment of the present disclosure, the responsive polymer film may be in-situ oxidized by the metal ions included in the aqueous solution, but may not be limited thereto. In an embodiment of the present disclosure, the responsive polymer film may be in-situ oxidized by the gold ions included in the aqueous solution.

A third aspect of the present disclosure provides a sensor, including a responsive polymer film of the first aspect.

Detailed descriptions of the third aspect of the present disclosure, which overlap with those of the first aspect and the second aspect of the present disclosure, are omitted hereinafter, but the descriptions of the first aspect and the second aspect of the present disclosure may be identically applied to the third aspect of the present disclosure, even though they are omitted hereinafter.

In an embodiment of the present disclosure, the polymer film may be polaronic conjugated P3HT homopolymer, or P3HT-b-PEG block copolymer.

In an embodiment of the present disclosure, the sensor may exhibit a different structural color depending on the oxidation-reduction state and/or thickness of the responsive polymer film.

In an embodiment of the present disclosure, the sensor may be chemically responsive and show a structural color change under a reductive gas, a reductive solution, an oxidative gas or an oxidative solution. Herein, the reductive gas, the reductive solution, the oxidative gas and the oxidative solution can be applied without limitation as long as the structural color can be changed depending on the oxidation-reduction state in consideration of the standard reduction potential, basicity, vapor pressure, surface characteristics, etc. For example, the reductive gas may include at least one selected from N,N-diisopropylethylamine, triethylamine, N,N-dimethylformamide, pyrrole, ammonia, hydrazine, ethyl acetate, acrylonitrile and formaldehyde, and the reductive solution may be a solution of the reductive gas, but may not be limited thereto. Also, for example, the oxidative gas may include at least one selected from iodine, oxygen, ozone and nitrogen oxide, and the oxidative solution may be a solution of the oxidative gas or may include at least one solution(s) selected from metal salts capable of generating metal cations such as $HAuCl_4$, $FeCl_3$, $FeTs_3(III)$ and $CuCl_2$, but may not be limited thereto.

In an embodiment of the present disclosure, the sensor may be that the responsive polymer film is transferred onto a substrate, but may not be limited thereto. In an embodiment of the present disclosure, any known substrate can be used for the sensor without limitation as long as the substrate allows sufficient reflection of the responsive polymer film to observe structural colors. Herein, for sufficient reflection, an index contrast between the film and the substrate needs to be sufficient to observe structural colors. For example, silicon, silicon oxide, glass or various metal substrates including at least one metallic layer(s) of silver, gold, titanium, platinum, copper, lead, zinc, aluminum, magnesium, nickel, chromium, manganese, zirconium, iron, calcium, lithium, tin, beryllium, hafnium, indium, and alloys, oxides, nitrides and carbonitrides thereof may be used as the substrate without limitation, but the present disclosure may not be limited thereto.

In an embodiment of the present disclosure, a flexible substrate may also be used for the sensor, and when reflection of the flexible substrate is insufficient, at least one metallic layer(s) may be further formed on the surface of the flexible substrate to a thickness capable of maintaining flexibility. For example, when PET is used as the substrate, at least one metallic layer(s) of silver, gold, titanium, platinum, copper, lead, zinc, aluminum, magnesium, nickel, chromium, manganese, zirconium, iron, calcium, lithium, tin, beryllium, hafnium, indium, and alloys, oxides, nitrides, and carbonitrides thereof may be formed on the surface of the PET to increase the index contrast, but the present disclosure may not be limited thereto. For example, titanium and platinum thin films may be sequentially formed on the surface of the PET, which may simultaneously provide reflectivity and mechanical flexibility to the substrate.

In an embodiment of the present disclosure, a transparent substrate may also be used for the sensor, and when reflection of the flexible substrate is insufficient, at least one metallic layer(s) may be further formed. For example, when glass is used as the substrate, at least one metallic layer(s) of silver, gold, titanium, platinum, copper, lead, zinc, aluminum, magnesium, nickel, chromium, manganese, zirconium, iron, calcium, lithium, tin, beryllium, hafnium, indium, and alloys, oxides, nitrides, and carbonitrides thereof may be formed on the surface of the glass to increase the index contrast, but the present disclosure may not be limited thereto. For example, the glass substrate whose surface is coated with ITO may be used.

In an embodiment of the present disclosure, the sensor may be used in an artificial olfactory system, but may not be limited thereto.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Examples

1. Test Method

Materials 1,2,3,4-tetrahydronaphthalene, gold chloride hydrate, oleylamine (technical grade, 70%), hexamethyldisilazane (HMDS) were purchased from Sigma-Aldrich. Toluene, hexane, acetone and acetonitrile were purchased from Duksan. A boron-tert-butyl amine complex was purchased from ACROS. ITO (indium tin oxide)-glass (0.55 mm thick) was purchased from Wooyang GMS. A polyester film was purchased from SKC. Ammonium hydroxide (25%) was purchased from Daejung.

Synthesis of
poly(3-hexylthiophene)-block-poly(ethylene glycol)

Poly(3-hexylthiophene)-block-poly(ethylene glycol) was synthesized by a copper(I)-catalyzed click reaction based on a previously reported synthesis procedure.

Synthesis of Gold Nanoparticles

Gold nanoparticles (diameter: 4.6±0.68 nm) were synthesized by a previously reported procedure, and the effect of nanoparticles on a structural color was investigated. 1,2,3,4-tetrahydronaphthalene (10 mL) and oleylamine (10 mL) were mixed with 0.1 g of hydrogen tetrachloroaurate(III) hydrate ($HAuCl_4·3H_2O$) under moderate stirring. A separate mixture of 1,2,3,4-tetrahydronaphthalene (1 mL) and oleylamine (1 mL) containing 0.5 mM boron-tert-butyl amine complex was added to the solution containing an Au precursor. After 1 hour reaction, acetone was added to the solution to precipitate the synthesized gold nanoparticles. The particles were washed twice with acetone and redispersed in toluene.

Preparation of Polymer Film by Liquid-Liquid
Interfacial Self-Assembly (LISA)

The synthesized P3HT-b-PEG polymer was dissolved in toluene and filtered through a syringe filter with 200 nm pores. 4 mL of a P3HT-b-PEG solution (1.35 μM to 4.05 μM) was carefully dropped at a rate of about 200 μL/min for initial 800 μL and then at a rate of 0.8 mL/min for remaining 3.2 mL into 18 mL of an aqueous solution of $HAuCl_4$ (100 μM) in a glass Petri dish (diameter 5.5 cm, height 1.5 cm). After the complete transfer of the P3HT-b-PEG solution, the Petri dish was covered with a lid. The yellow color of the solution almost completely transitioned into a gray film at the interface in about 3 hours. After 12 hours of incubation, the polymer film at the interface was separated from the rim of the vessel using a glass stick to suppress possible film damage during evaporation of the toluene. Then, the vessel was left with the lid partially opened to slowly evaporate the toluene, which took about 12 hours. The transfer of the polymer film from the water surface was achieved by lifting up the film at the interface with a suitable substrate.

To improve the adhesion of the +P3HT-b-PEG film, an Si substrate was pre-functionalized with hexamethyldisilazane (HMDS) and used as a reflective substrate to produce a structural color. A desired film thickness was achieved by stacking +P3HT-b-PEG films (25 nm to 50 nm) multiple times on the Si substrate. For example, a 110 nm-thick film was prepared by repeating the lift-up process three times (30 nm, 30 nm, and 50 nm film). In between transfers, the polymer film was soft-baked at 50° C. for 5 minutes by using a hot plate to suppress delamination during sequential lift-up processes. The final thickness of the film was measured by AFM.

Preparation of Polymer Film by Spin-Coating and
Structural Color of Thin Film

A P3HT homopolymer was dissolved in toluene to make a polymer solution, and then the polymer solution was dropped onto a substrate to form a P3HT film by spin-coating. Herein, in addition to toluene, an organic solvent such as dichlorobenzene, tetrahydrofuran, chloroform, etc. may be used as the solvent, and silicon, silicon oxide, PET or various metal substrates such as silver or gold may be used as the substrate.

The thickness of the P3HT film can be adjusted by adjusting the concentration and spin rate of the polymer solution, and the concentration of the polymer solution used in the present example is 10 g/L to 40 g/L, and the spin rate is 500 rpm to 8000 rpm. Under the above-described conditions, a polymer thin film having a thickness of about 20 nm to about 400 nm can be formed.

Referring to FIG. 5, it can be seen that the formed P3HT film has various colors depending on the thickness ((P3HT: green yellow (250 nm), light yellow (200 nm), yellow (150 nm), green yellow (100 nm), green (85 nm), blue green (65 nm), light blue (25 nm), +P3HT: dark green (250 nm), light blue (200 nm), blue (150 nm), purple (100 nm), light purple (85 nm), brown (65 nm), light brown (25 nm)), and polaron formation occurs reversibly during oxidation/reduction and a structural color changes accordingly. A change in structural color was observed from films having various thicknesses on a silicon substrate before and after oxidation/reduction, and "P3HT" indicates P3HT in a reduced state, and "+P3HT" indicates P3HT in an oxidized state.

Measurement of Responsive Structural Color

In a typical measurement, a polaronic +P3HT-b-PEG film on an Si wafer was placed in a sealed vessel (diameter 4.5 cm) with an aliquot of selected liquid (50 µL for most samples) for 60 minutes, where the chemical reaches its equilibrium vapor pressure. The amount of liquid was adjusted to 10 µL for ethyl ether to avoid the condensation. An ammonium hydroxide solution was used to produce an ammonia gas.

Characterization

Absorption spectra were measured with a UV-VIS spectrophotometer (Agilent 89090A, Agilent 8463). Grazing incidence X-ray diffraction (XRD) analysis was performed with an X-ray diffraction analyzer (X'pert PRO, PANalytical) using Cu K$\alpha$ ($\lambda$=1.54056 Å) radiation. The formation of gold nanoparticles on the polymer film was checked by using a scanning electron microscope (FE-SEM, MERLIN compact, Zeiss) and a TEM (JEM-2100F, JEOL). The film thicknesses were measured with an atomic force microscope (XE-7, Park system). Reflection measurements were performed using a spectrometer (Acton SP2356, Princeton Instruments) and a confocal microscope coupled to a white light-emitting diode (LED)(Thorlabs) source. A non-oxidized Ag film was used as a reference for reflectance measurements. The refractive indexes were measured with a spectroscopic ellipsometer (Woollam co.) having a +P3HT-b-PEG film on an Si wafer.

Electrochemical Characterization

Electrochemical tests were conducted using a potentiometer (CH1660E, CH instruments). Pt wire and an Ag/Ag$^+$ [filling solution: 0.01 M silver nitrate (AgNO$_3$) and 0.1 M tetrabutylamonium perchlorate (TBAP) in acetonitrile] electrode were used as a counter electrode and a reference electrode, respectively. An acetonitrile solution containing 0.1 M sodium perchlorate (NaClO$_4$) was used as an electrolyte. Electrochemical measurements were performed on a 110 nm thick +P3HT-b-PEG film transferred onto an ITO (indium tin oxide) electrode.

Finite-Difference Time-Domain (FDTD) Simulation

Electromagnetic simulations were performed using Maxwell's solver from Lumerical Inc. To model reflection by different film structures (e.g., +P3HT-b-PEG, nanoparticle-incorporated +P3HT-b-PEG), a plane-wave source was used for illumination. Perfectly matched layers (PML) and symmetric boundary conditions were used for the incident and lateral directions, respectively. Fine meshes of 0.5×0.5×0.5 nm$^3$ were constructed around Au NPs. The calculation region was 300×300×3500 nm$^3$. The dielectric functions of Au and Si were selected from Palik, and the dielectric function of +P3HT-b-PEG was measured by ellipsometry. The model approximated the Si substrate as a semi-infinite medium.

2. Test Results and Review

Preparation and Characteristics of P3HT-b-PEG Film

Homogeneous and transferable conjugated polymer films with controlled polaron density were prepared by LISA and simultaneous in-situ oxidation of P3HT-b-PEG. In brief, a toluene solution of P3HT-b-PEG was gently placed onto an aqueous solution of HAuCl$_4$ in a standard Petri dish (FIG. 1A), which was then covered with a lid to suppress evaporation of toluene. Over time, the characteristic orange color of P3HT disappeared from the toluene layer as P3H-b-PEG strands were deposited at the toluene-water interface (FIGS. 1C to 1F). Simultaneously, the P3HT-b-PEG film at the interface was oxidized into +P3HT-b-PEG by AuCl$_4$ ions present in the aqueous phase. This concomitant deposition and oxidation of the conjugated block copolymer produces a homogeneous gray +P3HT-b-PEG film at the toluene-water interface (FIGS. 1E and 1F). The same test was repeated in a tall vial to show a better side view of the spontaneous film formation at the liquid-liquid interface. After evaporation of the toluene, the polaronic polymer film floating on water was transferred onto a solid substrate by lifting up the film with a suitable substrate (FIG. 1B).

The LISA process is distinct from that of the air-liquid interfacial self-assembly (ALISA) which was reported previously and in which solvent evaporation and polymer-film formation occur simultaneously. In LISA, the self-assembly is decoupled from the solvent evaporation, which allows for the formation of uniform and thickness-controlled polymer films. The amphiphilic character of P3HT-b-PEG also facilitates the homogeneous deposition of the polymer at the interface. It is interesting to note that the presence of gold precursors in the water layer promotes the deposition of conjugated polymers at the liquid-liquid interface. When gold precursors were not present in the water layer, P3HT-b-PEG remained in the toluene layer without noticeable deposition at the interface even after a few days. In the liquid-liquid interfacial self-assembly with metal precursors according to the present disclosure, the in-situ oxidation of conjugated polymers altered their solubility, which resulted in spontaneous deposition of conjugated polymers without any postprocesses.

The polaronic state and its sensitivity to the electrochemical environment were evaluated by measuring the absorption spectra of the +P3HT-b-PEG film placed on an indium tin oxide (ITO)-coated glass substrate under different redox conditions (FIGS. 1C and 1D). The spectra of the prepared +P3HT-b-PEG film show the $\pi$-$\pi$* transition at 515 nm and another peak centered around 800 nm, which is characteristic of hole polaron states. The +P3HT-b-PEG film is electrochemically reduced at 0.0 V (vs. Ag/Ag$^+$) and positive charges in the film become compensated. As a result, the hole polaron peak intensity is suppressed while the $\pi$-$\pi$* transition peak intensity is increased. By applying a positive bias at 0.5 V (vs. Ag/Ag$^+$), the electrochemically reduced film transitions back to an oxidized state, as evidenced by the enhanced hole polaron peak. The data presented in FIG. 1G confirm that the gray polymer film formed at the interface is indeed polaronic P3HT, exhibiting electrochromic activity. The reduction of HAuCl$_4$ into Au nanoparticles, which occurs simultaneously with the oxidation of P3HT, was confirmed with an electron microscope (FIG. 1H). Transmission electron microscopy (TEM) and scanning electron microscopy (SEM) images show small Au nanoparticles (diameter: 2.4±1.4 nm) uniformly embedded within the polymer film and larger clusters of nanoparticles deposited on the side interfacing the HAuCl$_4$ solution (FIG. 1H). The fast Fourier transform (FFT) of real-space images of 2.4 nm particles revealed a lattice spacing of 2.34 Å corresponding to the (111) planes of Au. Grazing incidence X-ray diffraction (GIXRD) analysis also confirmed the presence of Au particles in the +P3HT-b-PEG film.

As described above, the polaronic P3HT-b-PEG film formed at the interface can be readily transferred onto a solid substrate. FIG. 1I presents photographs of polaronic P3HT-b-PEG films placed on a reflective Si wafer, which shows a range of various colors produced by varying the thicknesses of the polymer films. In LISA, the desired film thickness is achieved over a broad range by repeating the transfer process multiple times. FIG. 1I also shows that the colors are homogeneous over the entire Si wafer, which suggests excellent uniformity in film thickness. The coloration principle is schematically shown in FIG. 1J. Light normally reflected off the top (I) and bottom (II) polymer interfaces undergoes a $\pi$ phase shift in each case due to the higher index of the underlying medium. Constructive interference occurs when the optical path difference between these two reflected light rays is an integer multiple of the wavelength [$2nt=m\lambda$; t is film thickness, m is an integer (m=1, 2 . . . ), $\lambda$ is wavelength and n is the refractive index of the film]. Accordingly, the reflected colors depend on the thickness (t) and the refractive index (n) of the polymer film.

The colorimetric behavior arising from the thin-film interference effect of the +P3HT-b-PEG film was investigated by electromagnetic simulations (FIGS. 2A and 2B). FIG. 2A displays photographs of the surface from each film and the corresponding CIE colors ((grey (25 nm), purple (85 nm), blue (110 nm), yellow (200 nm), red (230 nm), green (300 nm)) extracted from the simulated spectra. Calculations were performed with a transfer matrix algorithm, where the optical constants for +P3HT-b-PEG and Si were obtained experimentally from ellipsometry and tabulated data, respectively. In general, the experimental data (Exp.) and the calculated data (Sim.) match fairly well (FIG. 2A). The distinct color and reflectance spectra for a series of films with different thicknesses suggest thin-film interference as the colorant mechanism. In fact, calculations of the reflection as a function of thickness and wavelength reveal features that are characteristic of optical interference, i.e., reflection bands periodically spaced over wavelength and thickness that satisfy the conditions for constructive interference (FIG. 2B). The highest measured reflection amounts to ~30%, achieved at the smallest film thicknesses (<50 nm). The relatively low reflection is attributed to the optical loss inherent in both +P3HT-b-PEG and Si, and reaches its maximum value when the contribution of +P3HT-b-PEG is negligible. Nonetheless, these reflection values suffice for discriminating colors under room light conditions (~50 lumens/ft$^2$). The effect of Au nanoparticles on the optical properties of +P3HT-b-PEG is negligible. The size of Au nanoparticles (2.4±1.4 nm) is half the size of the excitation wavelength, and they are sparsely distributed in the film, such that scattering and absorption of the particles contribute insignificantly to the overall reflection spectrum. The present inventors illustrate this effect through FDTD simulations and also by observing the reflection of a composite film prepared by spin-coating a mixture of P3HT and Au nanoparticles, where the present inventors found negligible differences in the reflection spectra with or without Au nanoparticles.

Structural Color Change Depending on Chemical Responsiveness of +P3HT-b-PEG

The appealing material characteristics of +P3HT for color tunability along with its electrochemical activity opens up interesting possibilities for chemically responsive structural colors. FIG. 3A presents reflection spectra and photographs of a blue-colored +P3HT-b-PEG film (thickness 125 nm) before and after exposure to an aromatic compound, pyrrole. Interestingly, the polaronic film undergoes a vivid color change from blue to dark brown (FIG. 3A, inset). The color change is not from the shrinkage or expansion of the film, as atomic force microscopy (AFM) measurements show consistent film thicknesses before and after the exposure. Rather, the reflection increase (FIG. 3A) in a wavelength range of 600 nm to 700 nm and the corresponding color change (FIG. 3A, inset) are caused by changes in the refractive index of the polymer film via chemical reduction of +P3HT by the vapor, in a manner similar to the observed absorption changes upon electrochemical reduction shown in FIG. 1G. The oxidation state of +P3HT films significantly influences the dielectric properties of P3HT by modifying the charge-coupled lattice deformations that define the polaron state. The interaction between P3HT and gas molecules influences the polaron state by modifying the charge density, and thereby impacts the polarizability of P3HT, which determines the refractive index.

Combined with thin-film designs, the above-described optical changes can provide characteristic information of gaseous species. To test the hypothesis, the color change and reflectance spectra were recorded for various chemical vapors (FIG. 3B). For quantification, the present inventors compared the reflection at 630 nm ($R_{630}$), which is near the reflection maximum of neutral films, and the reflection at 520 nm ($R_{520}$), which is near the $\pi$-$\pi$* peak wavelength of the P3HT block. FIG. 3B presents the reflection ratio ($R_{630}/R_{520}$) from films exposed to distinct chemical vapors, which are grouped depending on their functional groups of the chemical vapors in FIG. 3B. Herein, the reflection ratio for the reference film before the gas exposure is 0.54, and a larger reflection ratio means greater color change and responsivity. The data presented in FIG. 3B clearly show that the color change occurs selectively for amines and amides, which share high basicity (>~810 kJ/mol), regardless of the vapor pressure. The reflection ratio of the films exposed to other species with low basicity remains almost unchanged. The gas-phase basicity and vapor pressure of all measured vapors are listed in Table 1 below.

TABLE 1

| Chemical material | Gas basicity (kJ/mol) | Vapor pressure* (atm, 25° C.) |
|---|---|---|
| N,N-diisopropylethylamine | 963.5 | 0.0152 |
| Triethylamine | 951 | 0.0696 |
| N,N-dimethylformamide | 856.6 | 0.00364 |
| Pyrrole | 843.8 | 0.00769 |
| Ammonia | 819 | 0.473 (at 20° C.) |
| Ethyl acetate | 804.7 | 0.0906 |
| Diethyl ether | 801 | 0.578 |
| Tetrahydrofuran | 794.7 | 0.169 |
| Acetone | 782.1 | 0.241 |
| 1,4-dioxane | 770 | 0.0359 |
| toluene | 756.3 | 0.0283 |
| Acrylonitrile | 753.7 | 0.112 |
| Acetic acid | 752.8 | 0.0154 |
| acetonitrile | 748 | 0.0934 |
| Ethanol | 746 | 0.0576 |
| benzene | 725.4 | 0.0982 |
| Methanol | 724.5 | 0.126 |
| n-hexane | NA | 0.161 |
| Perfluorohexane | NA | 0.23 |
| 2,2,4-trimethylpentane | NA | 0.0509 |
| chloroform | NA | 0.207 |
| o-xylene | NA | 0.00639 |

(*Vapor pressure values were calculated using the thermodynamic parameters obtained from CHERIC for most chemicals. The thermodynamic parameters for N,N-diisopropylethylamine and ammonium hydroxide(ammonia) were obtained from references.)

Furthermore, the reflection ratio of the selective gases generally follows the known gas-phase basicity. For example, alkyl-substituted amines are more basic than ammonia in a gas phase due to the inductive effect. Indeed, the exposure of polaronic films to N,N-diisopropylethylamine and triethylamine results in greater changes in reflection ratios than ammonia and pyrrole. These correlations are consistent with the hypothesis of the present disclosure that the basicity is the key factor that affects the reactivity between the gas-phase molecules and polaronic films. The present inventors note that although molecules with higher gas-phase basicity generate stronger optical responses in general, the order of basicity from the highest to lowest value does not strictly correspond with that of the reflection ratio in some cases. For example, N,N-dimethylformamide (DMF) has a somewhat larger gas-phase basicity than ammonia (Table 1), but shows a lower reflection ratio. The data can be explained by the extremely low vapor pressure of DMF. For similar reasons, ammonia shows a slightly higher reflection ratio than pyrrole. Overall, the results clearly show that the polaronic polymer film is capable of color changes in response to selective gaseous species and the degree of spectral change correlates with the electron-donating capability of the chemicals.

The ability to visually detect reductive vapors is useful in real-life settings and can be of significant benefit to those with obtuse or impaired olfactory senses. To demonstrate this ability, the present inventors first applied +P3HT-based structural colors to the recognition of odors from fermented tofu (stinky tofu), which is known to contain reductive gases (FIGS. 4A to 4D). Upon exposure of the polymer film to the tofu odor, the original blue color transitioned to a dark purple color (FIG. 4B), demonstrating that the responsive structural color of the polaronic film is applicable to real-life chemicals. A control test using the P3HT film showed no color change before and after exposure to the fermented tofu (FIG. 4D), confirming that the responsive color change is unique to the polaronic film. A key advantage of the structural coloration over that of conventional dyes and pigments is that it offers a wide palette of colors via structural modification from a single material platform. To take advantage of the tunable coloration, the above-described test was repeated with +P3HT-b-PEG films with different thicknesses. As distinct from the blue-to-dark purple color change observed from the 110 nm-thick film (FIG. 4B), a green-to-orange color change was observed from a 160 nm-thick film (FIG. 4C) after exposure to the same tofu. This multicolor capability significantly improves the reliability of the diagnosis and provides a wealth of display options.

The inherent flexibility and portability of conjugated polymer films are appealing features for effectively conveying information to end users by enabling the integration of the indicator into the product package. To demonstrate this ability, +P3HT-b-PEG color films were prepared on a flexible polyethylene terephthalate (PET) substrate. Since PET exhibits little index contrast with the film, resulting in poor reflection, thin layers of titanium (Ti, 10 nm) and platinum (Pt, 100 nm) were sequentially evaporated onto the PET surface to render the substrate reflective. At this thickness, Pt maintains high reflectivity and mechanical flexibility owing to its ductility. The Ti wetting layer helps to maintain the adhesion of Pt on the film without any signs of damage under moderate bending conditions. Using this approach, the present inventors achieved a blue-colored +P3HT-b-PEG film on a flexible PET/Ti/Pt substrate. The flexible film was conformally attached to the interior of a glass jar containing a boiled egg to test the color responsivity to reductive vapors (ammonia, surfur dioxide, etc.) released during the decomposition process (FIGS. 4E to 4G). X-shaped masks were superimposed on top of the color film to associate the rotting process with a color-changing visual cue. The original blue color of the film was maintained in the jar containing a fresh egg, as shown in FIGS. 4E to 4G. When the fresh egg was replaced with a rotten one, the blue color transitioned to a red color. The +P3HT-b-PEG film was then reverted to its original state by immersing the film in an aqueous solution of $HAuCl_4$ (1 mM), regenerating the responsive color film.

Structural Color Change of P3HT Homopolymer Film when Exposed to Oxidative/Reductive Vapor or Solution The P3HT homopolymer film formed by spin-coating also exhibited a structural color change similar to that of the P3HT-b-PEG film when exposed to oxidative/reductive vapors or immersed in an oxidative/reductive solution. Examples of the reductive vapor that causes a structural color change may include N,N-diisopropylethylamine, triethylamine, N,N-dimethylformamide, pyrrole, ammonia, etc., and it is possible to adjust the conditions that can cause a structural color change depending on the reducing power of the vapor and the concentration of the vapor or the degree of oxidation of the film. Further, a solution phase of the reductive vapor such as aqueous ammonia may be used as the reductive solution and an iodine vapor may be used as the oxidative vapor. Furthermore, solutions such as $HAuCl_4$, $FeCl_3$ and $CuCl_2$ may be used as the oxidative solution. FIG. 6 shows changes in structural colors of films (P3HT: yellow, +P3HT: purple) when P3HT films exposed to an iodine vapor and an ammonia vapor, which are oxidative/reductive vapors.

Also, it was confirmed that various colors can be implemented during oxidation/reduction by using films with various thicknesses. FIG. 7 shows changes in structural colors of films when P3HT films with various thicknesses are exposed to a $HAuCl_4$ solution, which is an oxidative solution, and an ammonia vapor, which is a reductive vapor. The yellow P3HT film was oxidized to a purple film and reduced to its original state, yellow. Further, the green P3HT film was observed to change to brown and green again, and the light blue P3HT film was observed to change to light brown and light blue again.

In summary, through one-step oxidative LISA of conjugated block copolymers, the present inventors prepared homogeneous polaronic conjugated polymer films that can be implemented as the dielectric component in flexible, color-tunable, and chemically responsive structural color devices. The +P3HT-b-PEG film or P3HT homopolymer film displays a range of distinct thickness-dependent reflective colors from thin-film interference, which, in turn, transitions into another set of distinct colors in response to reductive vapors including biological decomposition products. The present disclosure is the first to demonstrate and exploit the chemical modification of the intrinsic optical properties of conjugated polymers for responsive structural colors and is in contrast to previous reports on electrical gas detection based on transport properties of P3HT. The possibility to combine multicolor visual recognition of chemical species reported herein with a mature electrical sensor technology also makes the conjugated polymer an appealing material choice for responsive structural colors in a wide range of applications.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A chemically responsive polymer film, comprising:
at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

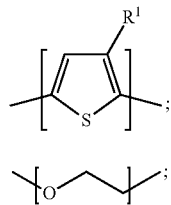

[Chemical Formula 1]

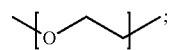

[Chemical Formula 2]

wherein in the above Chemical Formula 1,
$R^1$ is a linear or branched alkyl group having 1 to 8 carbon atoms,
wherein the chemically responsive polymer film is configured to exhibit different structural colors depending on a redox state and/or a thickness, and
wherein the chemically responsive polymer film is configured to exhibit a change in structural color depending on a standard reduction potential, basicity, vapor pressure of a reducing gas, a reducing solution, an oxidizing gas, an oxidizing solution, or surface properties of a substrate.

2. The chemically responsive polymer film of claim 1, wherein $R^1$ is selected from the group consisting of a methyl group, an ethyl group, a propyl group, a butyl group, a pentyl group, a hexyl group, a heptyl group, an octyl group and all possible isomers thereof.

3. The chemically responsive polymer film of claim 1, further comprising:
metal nanoparticles uniformly embedded within the chemically responsive polymer film.

4. The chemically responsive polymer film of claim 1, wherein a thickness of the chemically responsive polymer film is 20 nm to 400 nm.

5. A method of preparing a chemically responsive polymer film, comprising:
obtaining a chemically responsive polymer film including at least one of a polaronic conjugated homopolymer including a monomer represented by the following Chemical Formula 1 and a polaronic conjugated block copolymer including the monomer represented by the following Chemical Formula 1 and a monomer represented by the following Chemical Formula 2:

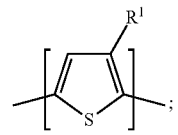

[Chemical Formula 1]

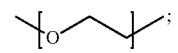

[Chemical Formula 2]

wherein in the above Chemical Formula 1,
$R^1$ is a linear or branched alkyl group having 1 to 8 carbon atoms,
wherein the chemically responsive polymer film exhibits different structural colors depending on a redox state and/or a thickness, and
wherein the chemically responsive polymer film exhibits a change in structural color depending on a standard reduction potential, basicity, vapor pressure of a reducing gas, a reducing solution, an oxidizing gas, an oxidizing solution, or surface properties of a substrate..

6. The method of claim 5,
wherein the method of preparing a chemically responsive film polymer film includes spin-coating or liquid-liquid interfacial self-assembly.

7. The method of claim 6,
wherein when the chemically responsive polymer film is prepared by the liquid-liquid interfacial self-assembly,
wherein the chemically responsive polymer film is prepared at the interface between a reactive solution including at least one of the homopolymer and the block copolymer and an aqueous solution including at least one metal ion(s) selected from the group consisting of gold, silver, iron, copper, nickel, and manganese.

8. The method of claim 7,
wherein the reactive solution is prepared by dissolving at least one of the homopolymer and the block copolymer in an organic solvent, and
wherein the organic solvent is at least one selected from the group consisting of toluene, dichlorobenzene, tetrahydrofuran, and chloroform.

9. The method of claim 7,
wherein the chemically responsive polymer film is in-situ oxidized by the metal ions included in the aqueous solution.

10. A sensor, comprising a chemically responsive polymer film of claim 1.

11. The sensor of claim 10,
wherein the sensor is that the responsive polymer film is transferred onto a substrate.

12. The sensor of claim 10,
wherein the sensor is used in an artificial olfactory system.

* * * * *